United States Patent
Oliveira et al.

(10) Patent No.: US 11,343,327 B2
(45) Date of Patent: May 24, 2022

(54) SYSTEMS AND METHODS FOR MANAGING VEHICLE OBD DATA IN A NETWORK OF MOVING THINGS, FOR EXAMPLE INCLUDING AUTONOMOUS VEHICLE DATA

(71) Applicant: Veniam, Inc., Mountain View, CA (US)

(72) Inventors: Patricia Oliveira, S.Félix da Marinha (PT); João Gomes, São Marcos (PT)

(73) Assignee: VENIAM, INC., Mountain View, CA (US)

( * ) Notice: Subject to any disclaimer, the term of this patent is extended or adjusted under 35 U.S.C. 154(b) by 280 days.

(21) Appl. No.: 15/428,085

(22) Filed: Feb. 8, 2017

(65) Prior Publication Data

US 2017/0324817 A1 Nov. 9, 2017

Related U.S. Application Data

(60) Provisional application No. 62/332,371, filed on May 5, 2016.

(51) Int. Cl.
| | |
|---|---|
| *H04L 67/142* | (2022.01) |
| *H04L 67/12* | (2022.01) |
| *H04L 67/10* | (2022.01) |
| *H04L 67/52* | (2022.01) |
| *H04W 4/38* | (2018.01) |
| *H04W 4/44* | (2018.01) |
| *H04W 4/029* | (2018.01) |
| *H04W 4/80* | (2018.01) |
| *H04W 4/02* | (2018.01) |

(52) U.S. Cl.
CPC ............ *H04L 67/142* (2013.01); *H04L 67/10* (2013.01); *H04L 67/12* (2013.01); *H04L 67/18* (2013.01); *H04W 4/38* (2018.02); *H04W 4/44* (2018.02); *H04W 4/02* (2013.01); *H04W 4/029* (2018.02); *H04W 4/80* (2018.02)

(58) Field of Classification Search
CPC ....... H04L 67/142; H04L 67/12; H04L 67/10; H04L 67/18; H04W 4/44; H04W 4/02; H04W 4/38; H04W 4/80; H04W 4/029
USPC .......................................................... 709/230
See application file for complete search history.

(56) References Cited

U.S. PATENT DOCUMENTS

| | | | | |
|---|---|---|---|---|
| 6,175,859 | B1 * | 1/2001 | Mohler | G06Q 10/107 709/206 |
| 2005/0005167 | A1 * | 1/2005 | Kelly | H04L 41/28 726/4 |

(Continued)

FOREIGN PATENT DOCUMENTS

| | | | |
|---|---|---|---|
| CN | 103455020 A | * 12/2013 | |
| EP | 2685430 A1 | * 1/2014 | G07C 5/008 |

*Primary Examiner* — Umar Cheema
*Assistant Examiner* — John Fan
(74) *Attorney, Agent, or Firm* — McAndrews, Held & Malloy, Ltd.

(57) ABSTRACT

Various aspects of this disclosure provide systems and methods for managing vehicle on-board diagnostic (OBD) data in a network of moving things. As non-limiting examples, various aspects of this disclosure provide systems and methods for interfacing with vehicle OBD systems, acquiring OBD data, communicating OBD data, and/or processing OBD data in a network of moving things, for example including OBD data of autonomous vehicles and other vehicles.

28 Claims, 11 Drawing Sheets

(56) References Cited

U.S. PATENT DOCUMENTS

| | | | |
|---|---|---|---|
| 2006/0095199 A1* | 5/2006 | Lagassey | G07C 5/008 |
| | | | 701/117 |
| 2008/0205610 A1* | 8/2008 | Bishop | H04L 51/24 |
| | | | 379/93.24 |
| 2014/0011483 A1* | 1/2014 | Baumert | G07C 5/008 |
| | | | 455/414.1 |
| 2015/0228127 A1* | 8/2015 | Ross | G07C 5/0808 |
| | | | 701/31.4 |
| 2016/0197776 A1* | 7/2016 | Das | H04L 41/0806 |
| | | | 455/419 |
| 2019/0090174 A1 | 3/2019 | Rocci et al. | |

* cited by examiner

SYSTEMS AND METHODS FOR MANAGING VEHICLE OBD DATA IN A NETWORK OF MOVING THINGS, FOR EXAMPLE INCLUDING AUTONOMOUS VEHICLE DATA

CROSS-REFERENCE TO RELATED APPLICATIONS/INCORPORATION BY REFERENCE

This patent application makes reference to, claims priority to, and claims benefit from U.S. Provisional Patent Application Ser. No. 62/332,371, filed on May 5, 2016, and titled "Systems and Methods for Managing Vehicle OBD Data in a Network of Moving Things," which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, vehicles comprising on-board diagnostic systems, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
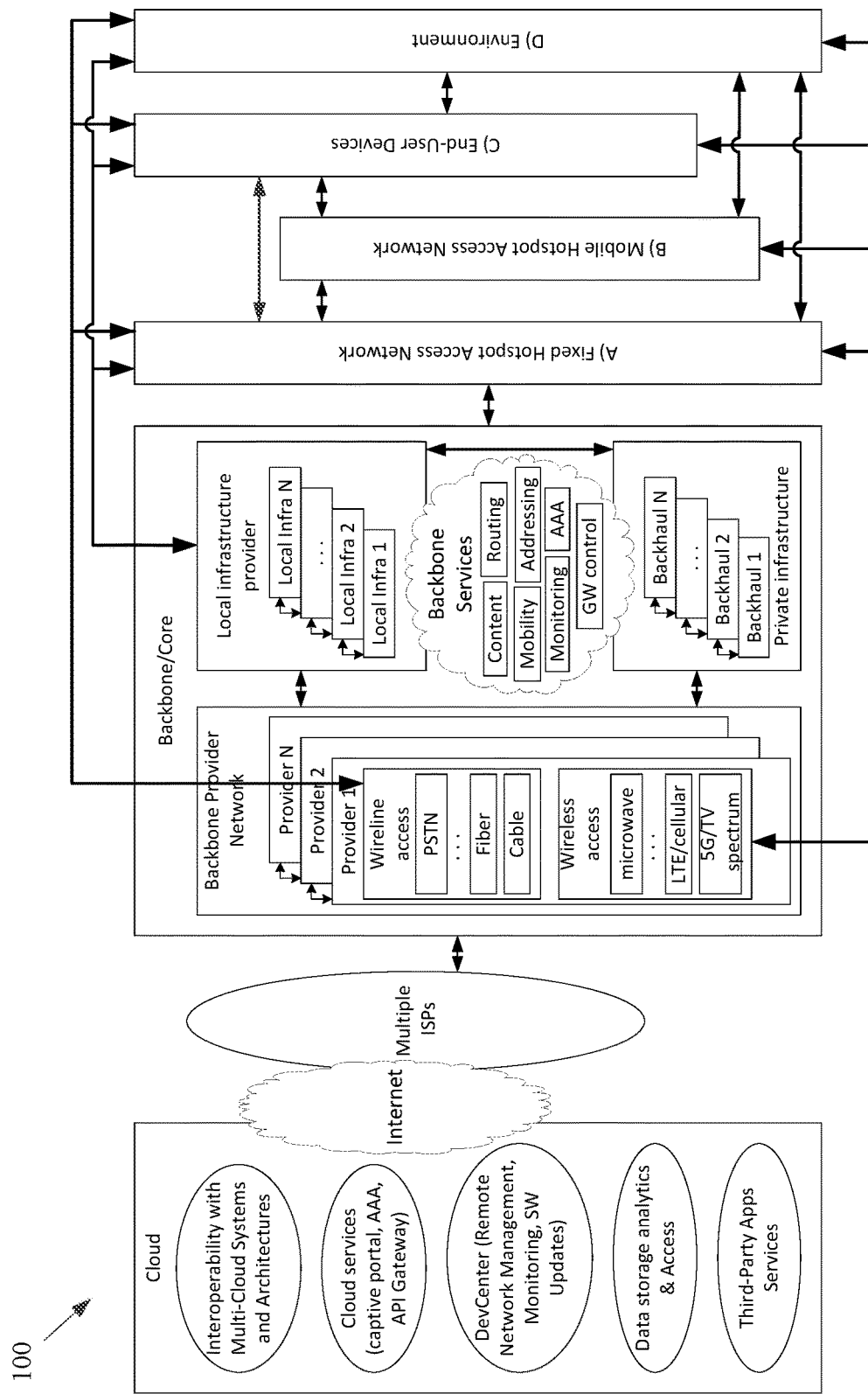
FIG. 1 shows a block diagram of a communication network, in accordance with various aspects of this disclosure.

Various aspects of this disclosure provide systems and methods for managing vehicle on-board diagnostic (OBD) data in a network of moving things. As non-limiting examples, various aspects of this disclosure provide systems and methods for interfacing with vehicle OBD systems, acquiring OBD data, communicating OBD data, and/or processing OBD data in a network of moving things for example including OBD data of autonomous vehicles and other vehicles.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
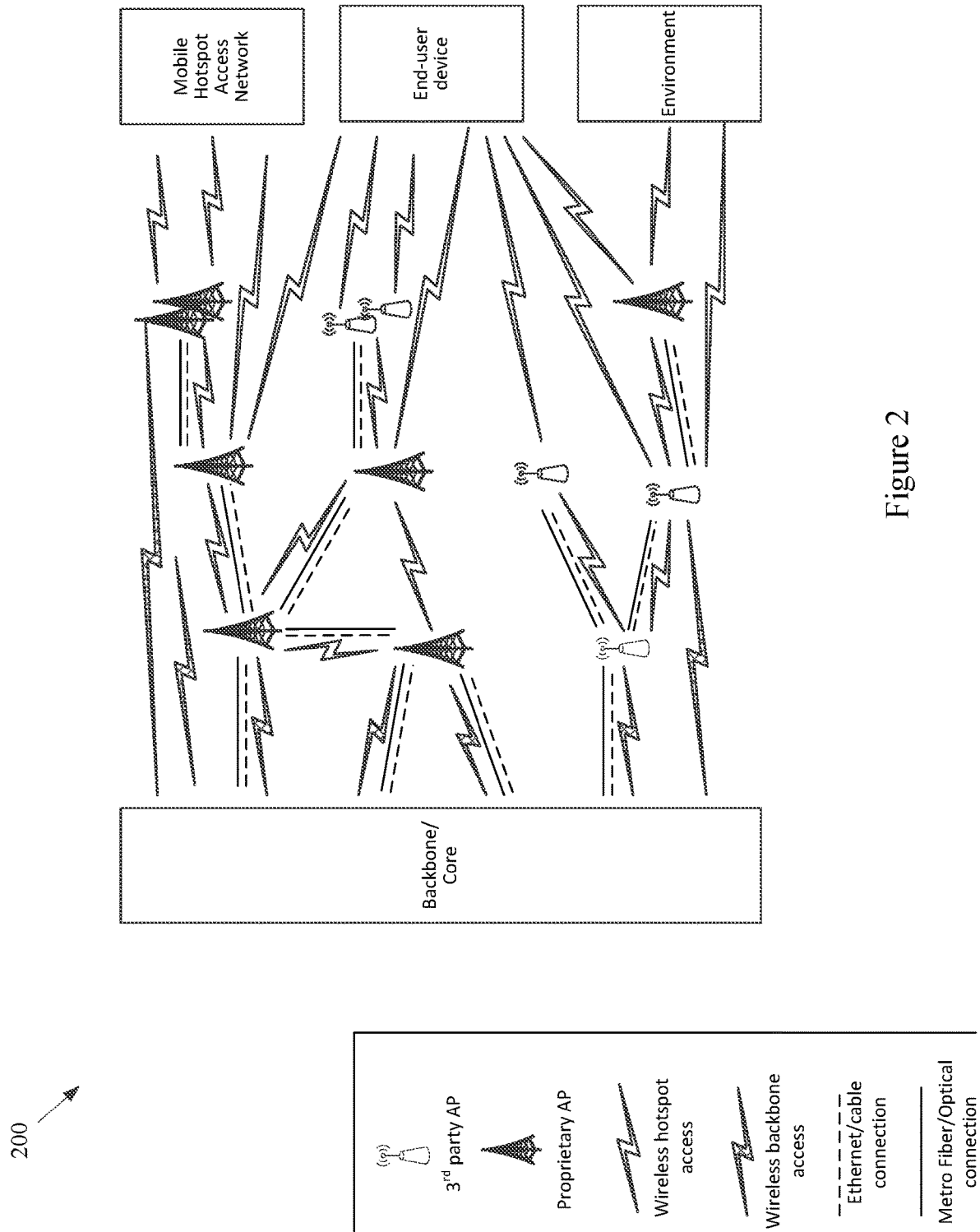
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
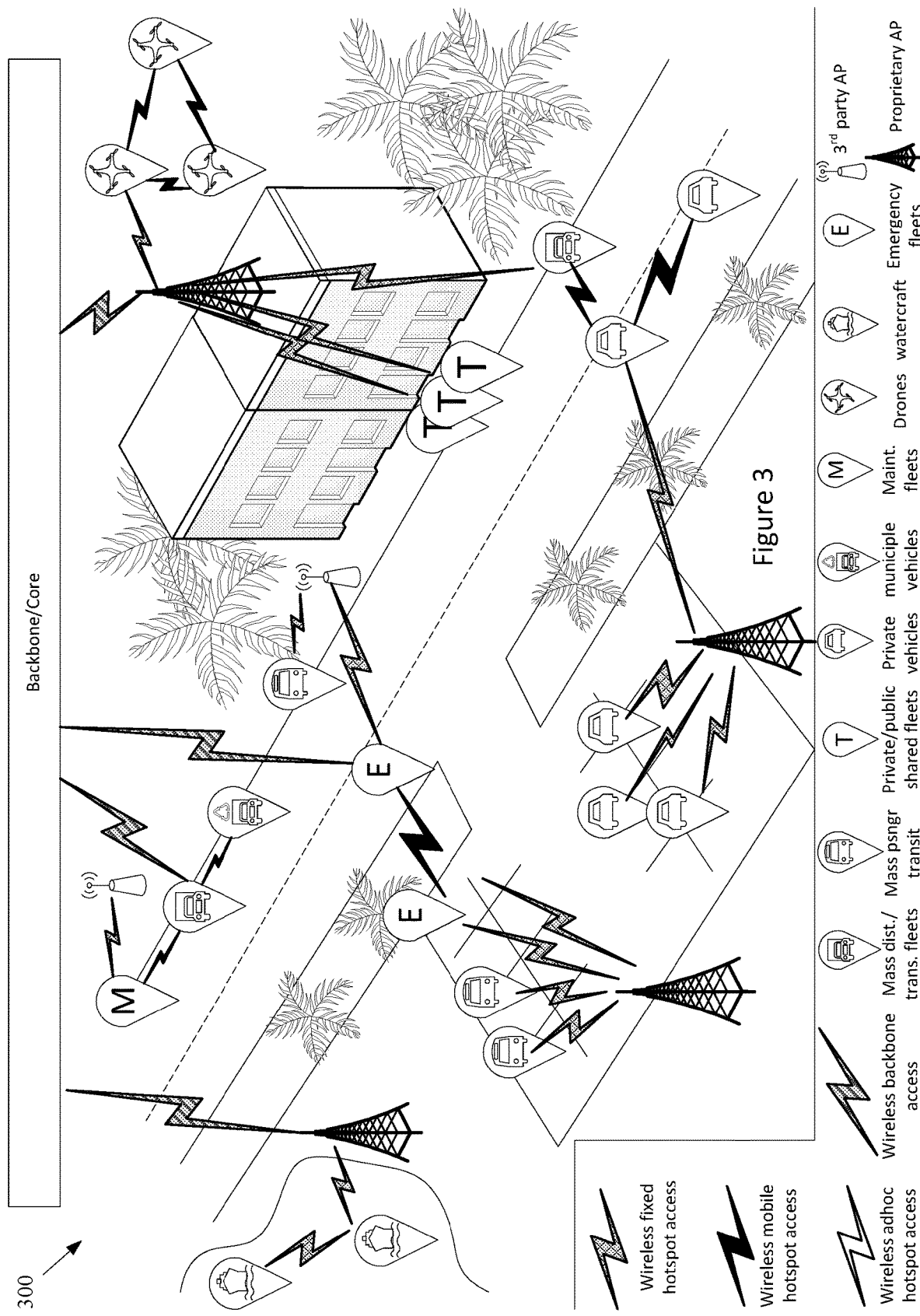
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
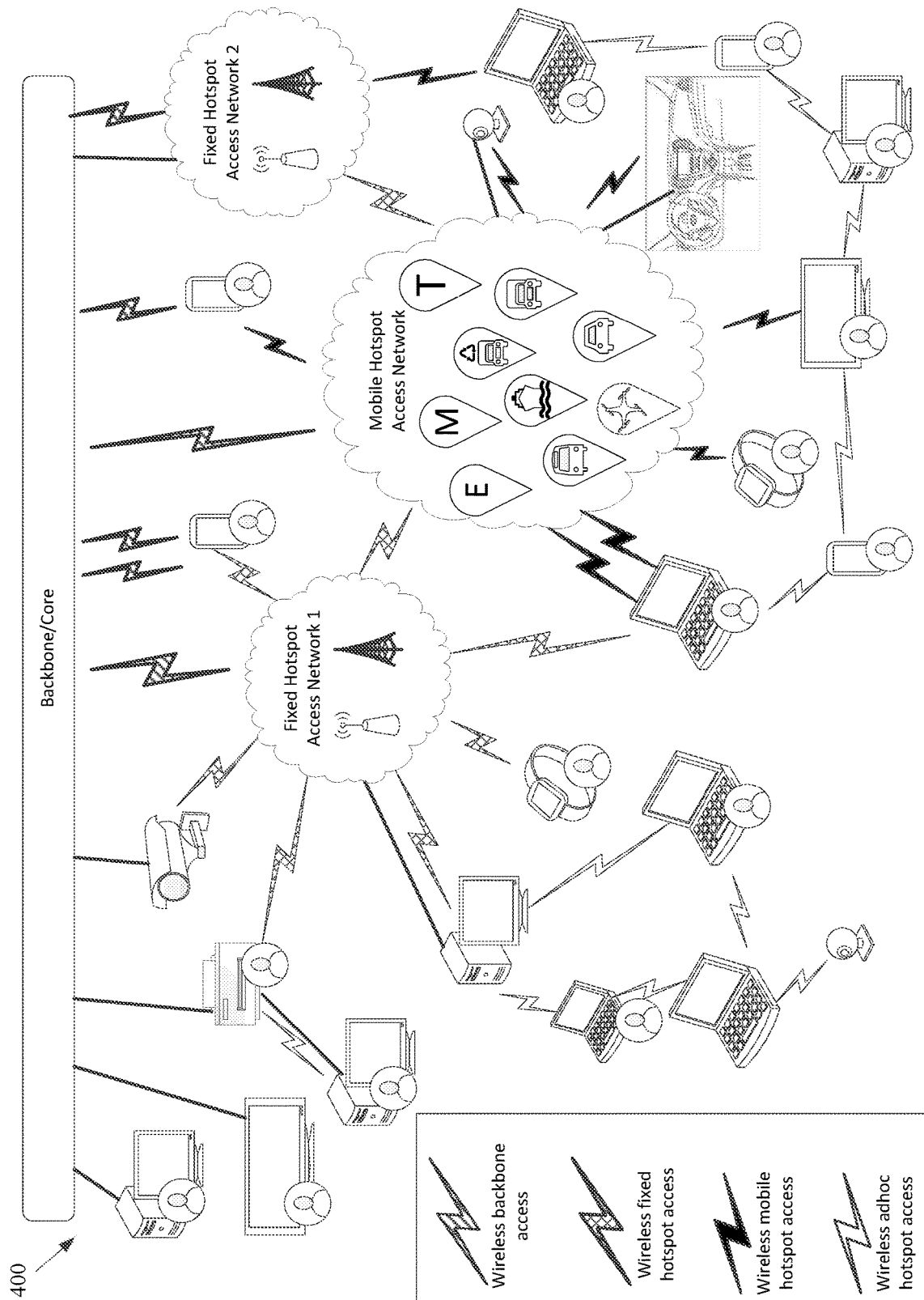
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
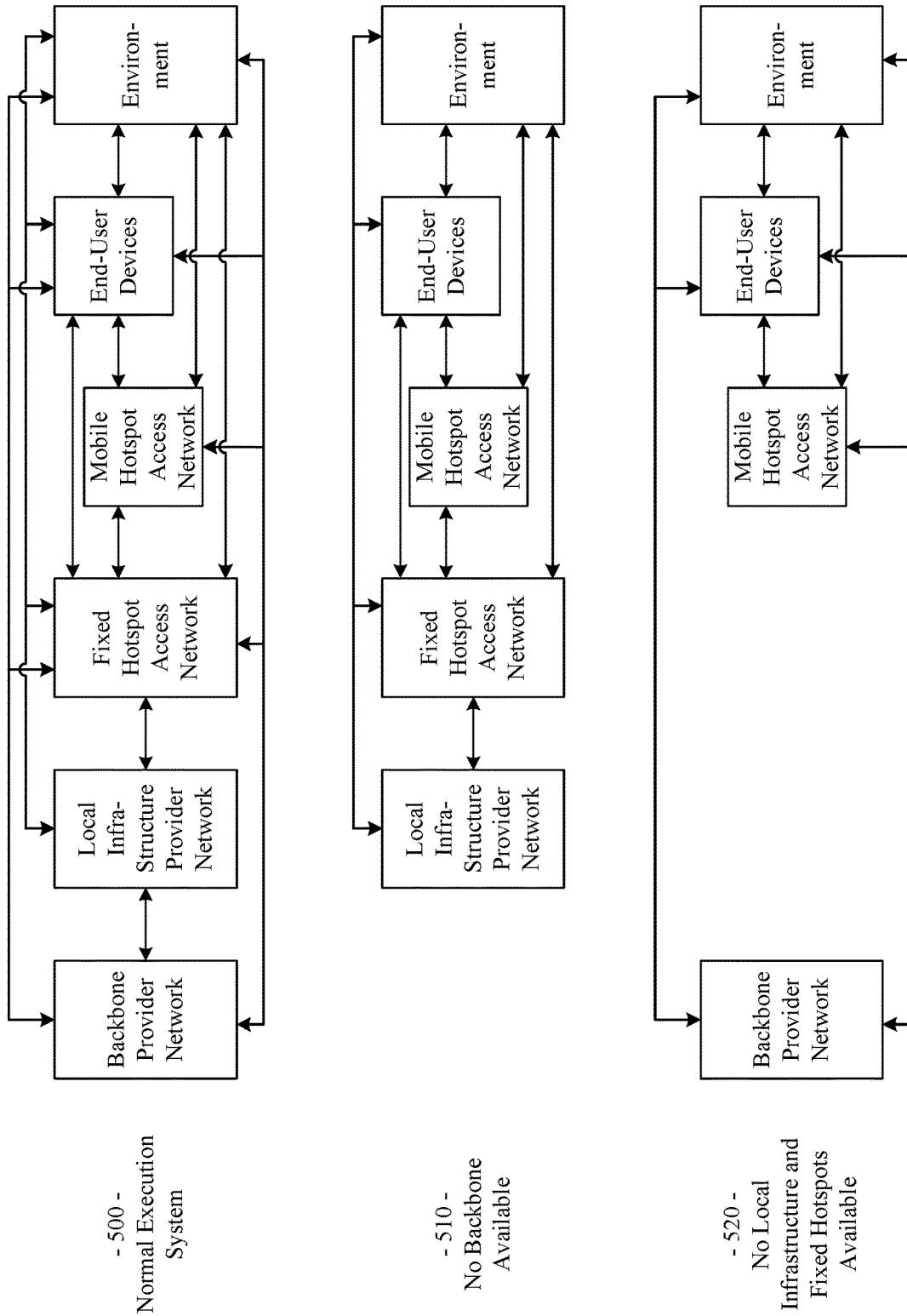
FIGS. 5A-5C show a plurality of network configurations illustrating the flexibility and/or and resiliency of a communication network, in accordance with various aspects of this disclosure.
Figure 5B:
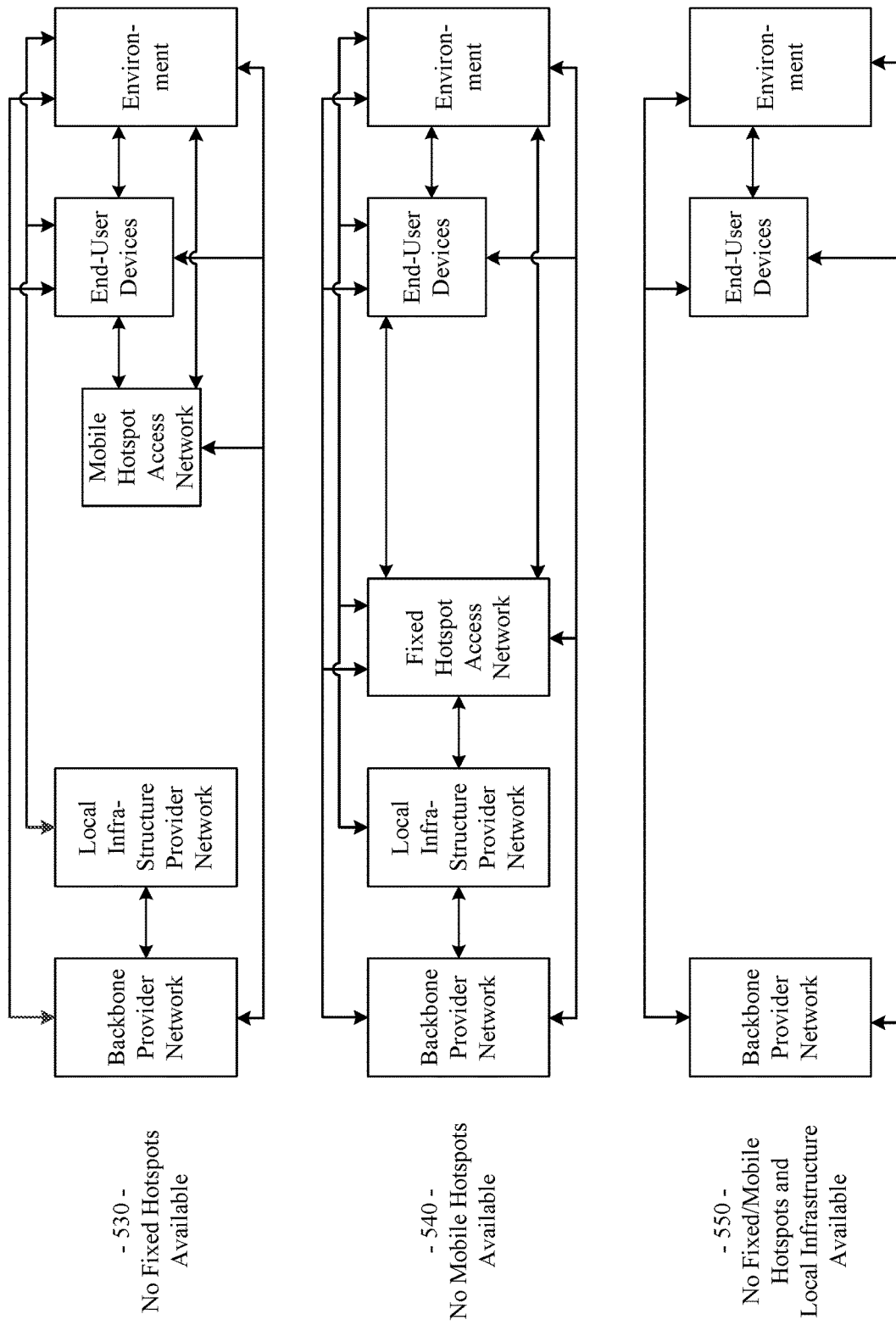
Figure 5C:
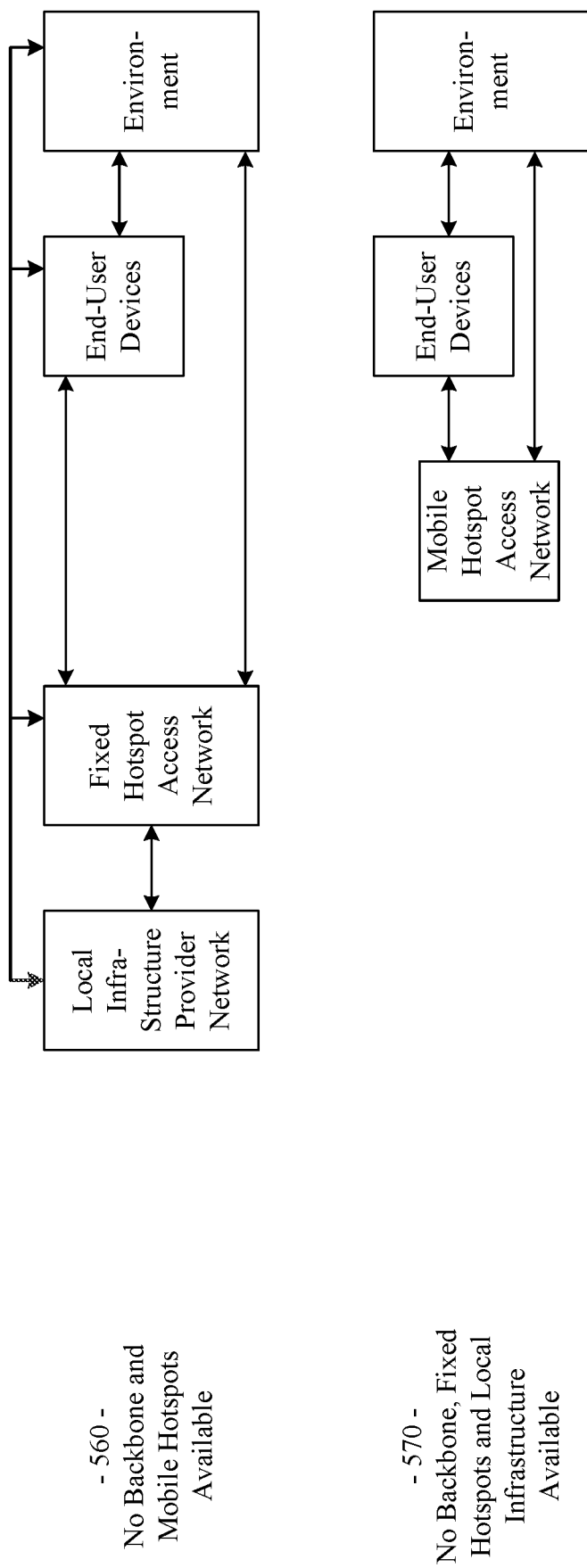

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.).

For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
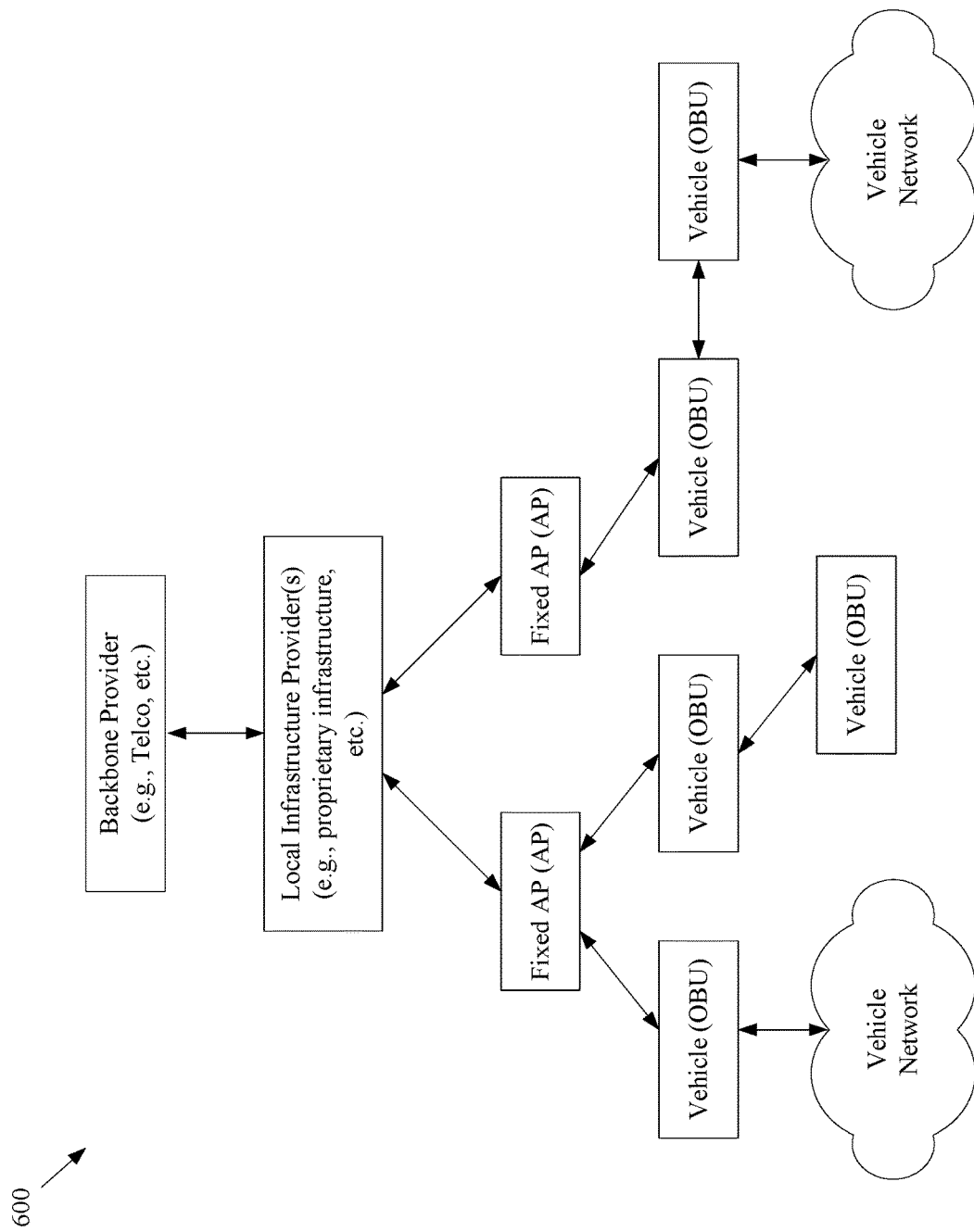
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

An On-Board Diagnostics (OBD) system is generally a computer-based system, which allows the monitoring and performance control of various engine components of the vehicle. An OBD system generally comprises an Electronic Control Unit (ECU), which for example processes information from a vehicle's sensors to control the vehicle's actuators. The ECU may also, for example, provide information about the vehicle's status to the driver (e.g., on a video display or other user interface device).

Presently, new vehicles generally provide an interface to access the OBD system, which may also be referred to as a Diagnostic Link Connector (DLC), for data interchange between the vehicle (ECU) and a diagnostic tool.

The first generation of OBD systems are generally referred to as OBD-I systems. Since in those systems the diagnostics interface and protocols were defined by each vehicle's respective manufacturer (e.g., sometimes designed to work with only a single vehicle model), which hindered the diagnostic process, the need arose for a universal scanner. In response, OBD-II compliant systems were developed to use a single diagnostic connector (SAE J1962) and communicate via one of the standard OBD-II communication protocols, for example ISO 9141-2, ISO 14230-4/KWP2000, SAE J1850 PWM, SAE J1850 VPW and ISO 15765-4 (CAN). Presently, new vehicles support OBD-II diagnostics, enhancing the adaptability of the system to different types of models and vehicles.

Note that although this disclosure will generally refer to the OBD-II standard, the scope of this disclosure is not limited thereto. For example, the scope of this disclosure applies generally to any on-board vehicle system that collects and/or analyzes information regarding the vehicle. For example, although there are some types of vehicles (e.g., pre-OBD-II vehicles, marine vehicles, various aircraft, rail vehicles, construction vehicles, cargo handling vehicles, etc.) that might not conform to the OBD-II standard, they may utilize generally analogous diagnostic systems and/or protocols. For example, an autonomous vehicle may have a different protocol (or portion(s) thereof) than a manually-operated vehicle of a same general type, for example providing access to a different set of information (e.g., information associated with autonomous vehicle command or control, sensors, etc.).

The information acquired from a vehicle's OBD system may be of great value in a network of moving things. For example, such information provides a tool for the complete real-time monitoring and management of a vehicular fleet and analysis of the vehicle's surrounding environment. Such information thus contributes to the concept and realization of the smart city.

Data collected from the vehicle may be accessed locally, for example presented visibly or audibly to the driver (e.g., quick notification of problems or potential problems, etc.). Such data may also be communicated to and/or stored in the Cloud and subjected to further processing, for example to provide relevant (or useful) information to clients (e.g., estimation of driver working hours, average fuel consumption of a vehicle or fleet, predictive vehicle maintenance requests, etc.).

Various aspects of the present disclosure provide systems and methods that take advantage of the information made available by the vehicles, through their respective OBD systems, for network or vehicle monitoring and management purposes, not only regarding the vehicle fleet but also the city (e.g., engine emissions and fuel consumption, etc.).

Various aspects of the present disclosure provide systems and method that gather different pieces of information collected by different types of vehicles (e.g., light-duty, heavy-duty, marine, rail, aircraft, etc.), for example to collect metrics regarding the city, such as pollution levels, ambient air temperature, barometric pressure, traffic congestion, road conditions, etc.

Various aspects of the present disclosure provide systems and methods that transport the gathered data to the Cloud through the network to be stored and/or processed. Such communication (or data transport) may, for example, be performed in real-time or in an opportunistic way (e.g., in a delay tolerant manner, waiting for a preferred type of communication network link to become available, etc.). The gathered data may thus be available to several types of customers with respective interests (e.g., operators of private and public fleets, environmental organizations, municipal planners, etc.).

Various aspects of the present disclosure provide an OBD connection smart system capable of managing the OBD connection as well as making decisions regarding the whole system, for example based upon the information provided by the vehicle and the current context (e.g., type of vehicle, surrounding environment, etc.).

Figure 7:
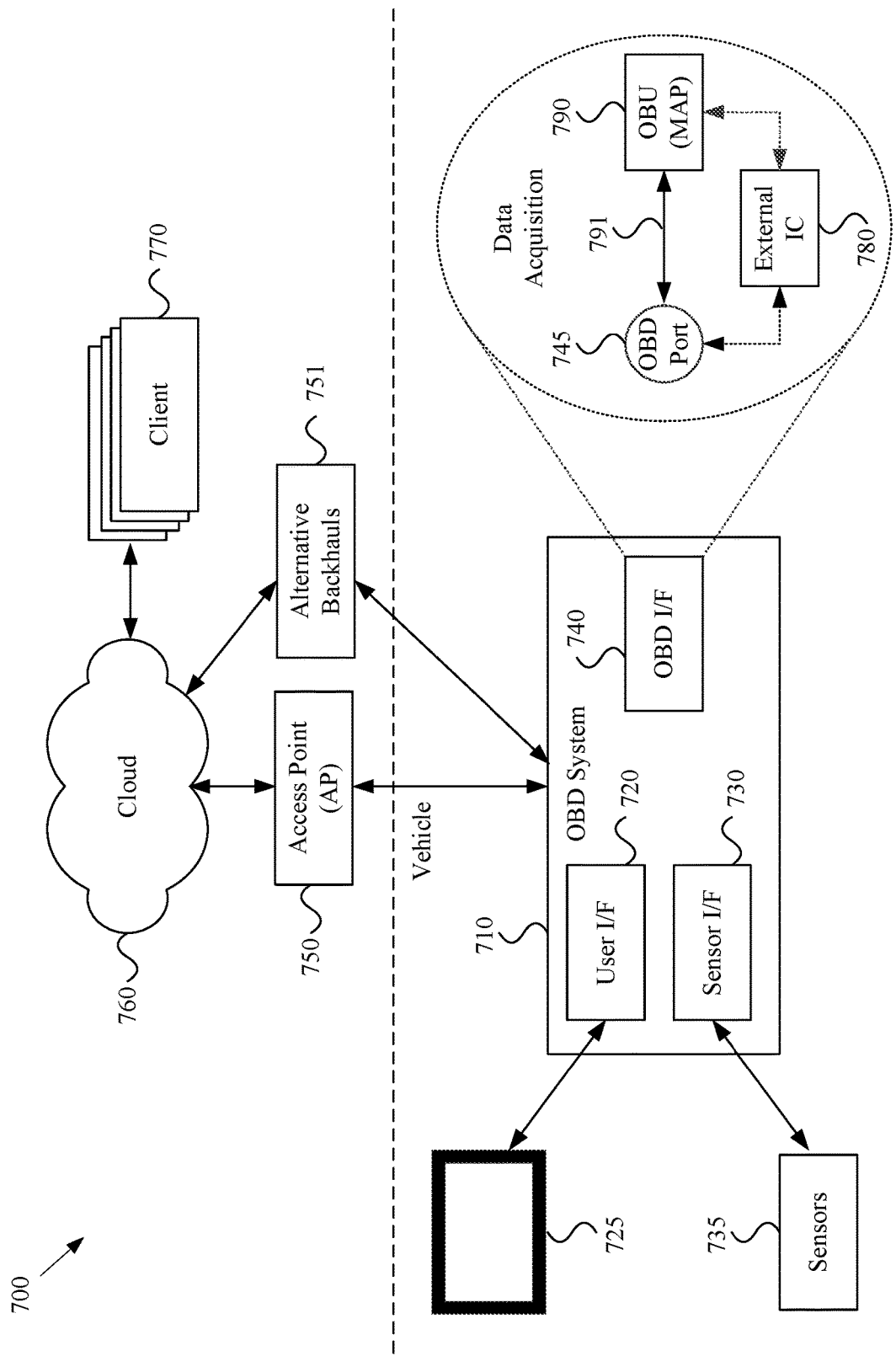
FIG. 7 shows a block diagram of a system for managing OBD data, in accordance with various aspects of the present disclosure.

FIG. 7 shows a block diagram of a system for managing OBD data, in accordance with various aspects of the present disclosure. The example system 700 may, for example, share any or all characteristics with the other example methods, systems, networks, and/or network components 100, 200, 300, 400, 500-570, 600, 800, and 900 discussed herein. For example, any or all of the components of the example system 700 may perform any or all of the method steps or functions presented herein.

The example system 700 (or network) comprises a vehicle OBD system 710. As discussed herein, the vehicle OBD system 710 may comprise an Electronic Control Unit (ECU). The vehicle OBD system 710 (e.g., an ECU or other component) comprises a user interface (I/F) module 720 that is communicatively coupled to a display 725 and/or any one or more of a variety of user interface devices (e.g., audio devices, tactile communication devices, personal electronic devices, smart phone, smart watch, etc.). The acquired vehicle (or sensor) information discussed herein (or related metrics) may thus be presented (e.g., on a display 725, etc.) to a driver or other person. The driver may also, for example, be able to communicate data acquisition commands to the OBD system 710 via the user I/F module 720.

The vehicle OBD system 710 (e.g., an ECU or other component) also comprises a sensor interface (I/F) module 730 that is communicatively coupled to one or more vehicle sensors 735 (e.g., speed sensors, RPM sensors, temperature sensors, vibration sensors, emission sensors, tire pressure sensors, weight sensors, fluid level sensors, fuel sensors, oil sensors, transmission fluid sensors, coolant sensors, battery voltage and/or current sensors, HVAC sensors, humidity sensors, barometric pressure sensors, emission sensors, noise sensors, moisture sensors, light sensors, electromagnetic sensors, position or location sensors, orientation sensors, still and/or moving image sensors, driver and/or passenger biometric sensors, gas particle sensors, breath sensors, etc.). In general, the vehicle sensors 735 may comprise any sensor, for example sensors related to vehicle operation, operating environment (e.g., engine compartment, passenger compartment, cargo compartment, external to the vehicle, etc.), driver and/or passenger characteristics or behavior, the general context in which a vehicle is operating, etc.

The example vehicle OBD system 710 (e.g., an ECU or other component) additionally comprises an OBD interface (I/F) module 740 that is communicatively coupled to an OBU 790 (or Mobile AP) of the vehicle. As discussed herein, the terms "OBU" and "Mobile AP", as utilized herein, are generally synonymously. Such communicative coupling may, for example, be via a direct communication link 791. For example, the OBU 790 may be communicatively coupled to an OBD port 745 (e.g., to a diagnostic link connector (DLC) or other interface). The OBU 790 may, for example, be directly communicatively coupled to the OBD I/F module 740 in any of a variety of manners, for example via a wired or tethered optical connection (e.g., dedicated cable, network cable, power line, optical fiber, etc.), via a wireless or non-tethered optical connection (e.g., Bluetooth or other PAN connection, Wi-Fi or other LAN connection, proprietary wireless protocol, laser connection, etc.).

The OBU 790 may also for example, be communicatively coupled to the OBD port 745 via an external integrated circuit (IC) 780. Note, however, that the IC 780 (or any portion thereof) may also reside within the OBU 790 and/or within the OBD I/F 740. The IC 780 may, for example, operate as an intermediary (or translator) between the OBU 790 and the OBD I/F 740. For example, the IC 780 may perform protocol conversion between the OBU 790 and the OBD I/F 740 (or a port 745 thereof). The OBU 790 and the vehicle OBD system 710 may thus communicate any or all of the vehicle (or sensor) data discussed herein. Note that such data may be communicated in a push manner in which the vehicle OBD system 710 sends the data autonomously and/or in a pull manner in which the OBU 790 requests data from the vehicle OBD system 710. In an example implementation, a Cloud server may communicate a request for OBD data to the OBU 790 using a protocol that is understood by both the Cloud server and the OBU 790. The OBU 790 (e.g., via a dedicated circuit, via a processor operating in accordance with software instructions, etc.) may then translate the data request from the Cloud into a protocol (or language) understood by the particular OBD system 710 to which the OBU 790 is coupled.

The OBU 790 of the vehicle may then communicate any vehicle-related information to the Cloud 760, for example directly or through one or more access points 750 (e.g., Fixed APs, Mobile APs, etc.). Note that the OBU 790 may also communicate the vehicle-related information to the Cloud 760 utilizing any or all of the communication pathways discussed herein (e.g., vehicle network pathways (e.g., utilizing DSRC, etc.), cellular backhaul pathways (e.g., utilizing LTE, etc.), Wi-Fi pathways ultimately through the Internet, etc.), illustrated generally as Alternative Backhauls 751. The OBU 790 may also, for example, receive control information from the Cloud 760 (or other system node) directing the type of data that is acquired and/or the manner in which the data is acquired. Many examples of controlling the type of data that is acquired and/or the manner in which the data is acquired are provided herein. Such control may originate at any one or more of a variety of nodes of the network 700 (e.g., at a server or database in the Cloud 760, at a Client 770 node, at the OBU 790, at the OBD system 710, etc.).

As discussed herein, any or all of the acquired information may be communicated locally within the vehicle (e.g., to the driver, etc.). Note that, in a configurable manner, some information might only be communicated to the vehicle driver (e.g., via the User OF 720), other information might only be communicated to the Cloud (e.g., via the OBU 790), and still other information may be communicated to both the vehicle driver and to the Cloud 760.

In accordance with various aspects of this disclosure, each vehicle may act as a Mobile AP and as a router, providing an interface to connect to the vehicle's OBD system (e.g., the OBD port 745).

In an example scenario, the OBU 790 (or other system) may request diagnostic data from the vehicle by accessing the OBD port 745 through a communication interface (e.g., wired interface, tethered optical interface, Bluetooth interface, Wi-Fi interface, etc.). As explained herein, the communication interface may be direct or may be indirect through an intermediary IC that translates between the vehicle's (or OBD's) communication protocol and the OBU's 790 (or Mobile AP's) communication protocol.

The Cloud 760 may, for example, comprise one or more databases and/or servers that store and/or process information obtained from the OBD system 710. Such databases and/or servers may, for example, provide an interface (e.g., APIs, etc.) that enable one or more clients to access gathered vehicle data, direct the type of vehicle data that is gathered and/or the manner in which such vehicle data is gathered, direct the storage and/or processing of gathered data, etc.

The gathered information (or a portion thereof) may, for example, be accessed through a client's subscription (e.g., by generating a request to one or more of the system's nodes). Also for example, the gathered information (or a portion thereof) may be constantly available for accessing (e.g., the system's nodes may always send real-time information). A client may retrieve or view the data, for example by accessing the Cloud through the Internet, by accessing a network monitoring center, etc.

The interaction between the various entities may, for example, be handled by a smart system capable of retrieving data from the vehicle and capable of flexibly adapting its run-time execution based on various types of received inputs (e.g., provided by various sensors, etc.). Many examples of such adaptation are provided herein.

As discussed herein, the OBU (or Mobile AP) may communicate with the vehicle's OBD system (e.g., OBD-II system, OBD-1 system, other types of vehicle monitoring and/or diagnostic systems, etc.) using any of a variety of types of communication links. The type of communication link may be selected based on any of a variety of criteria, non-limiting examples of which are provided herein.

Figure 8:
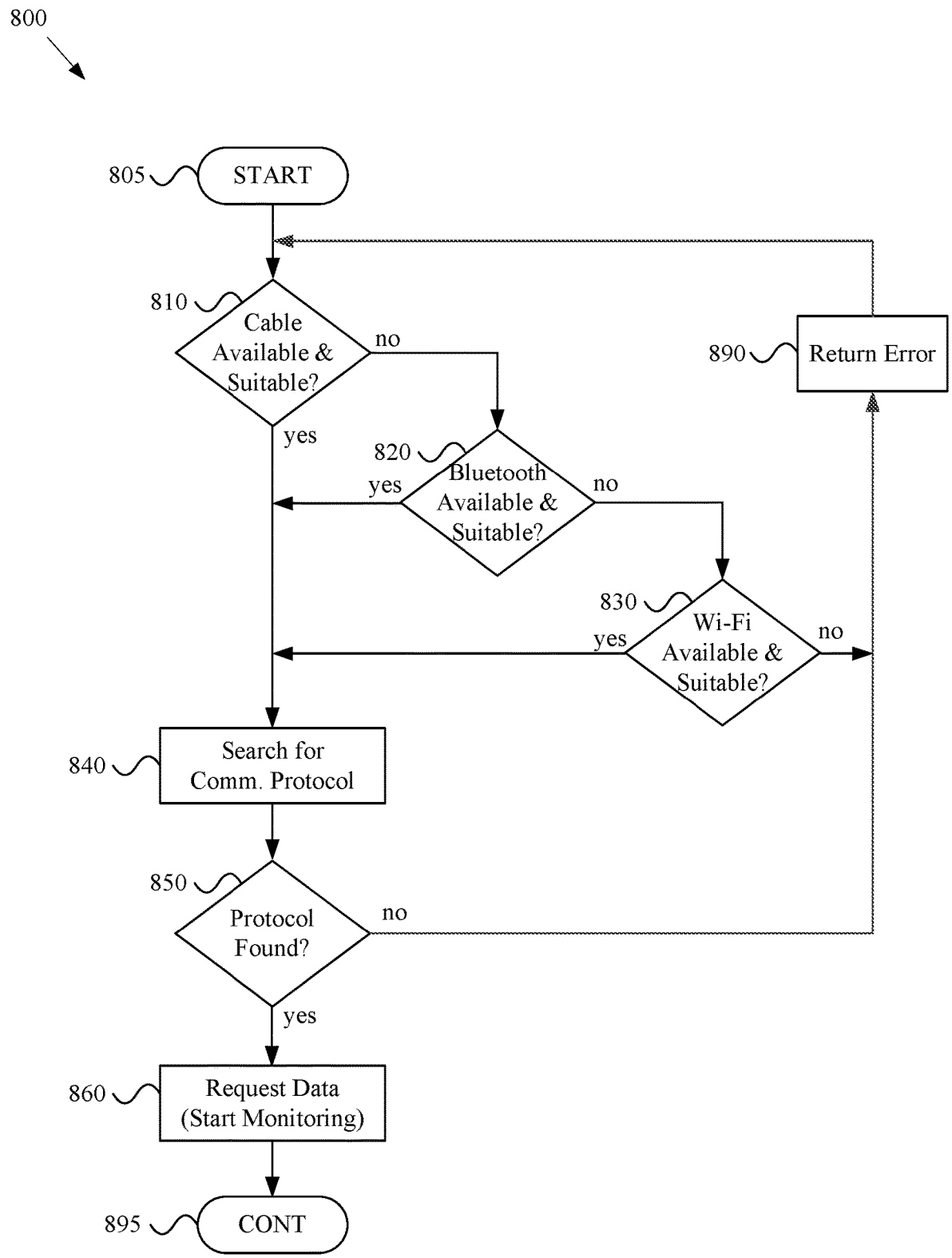
FIG. 8 shows a flow diagram of a method for managing OBD data, in accordance with various aspects of the present disclosure.

An example operating method 800, for example including communication link selection, data selection, and monitoring, is shown in FIG. 8. The example method 800 may, for example, share any or all characteristics with the other example methods, systems, networks, and/or network components 100, 200, 300, 400, 500-570, 600, 700, and 900 discussed herein. For example, any or all of the blocks (or steps) of the example method 800 may be performed by any one or more of the network components presented herein (e.g., a Mobile AP, Mobile AP and external IC, Mobile AP and Cloud server, etc.).

In the example method 800, to collect data from the OBD system of the vehicle, the system may select from three different types of connections between the Mobile AP (or OBU) and the OBD system (e.g., OBD-II port, etc.). The example types of connections include a cable (or wire), Bluetooth, and Wi-Fi. Note that the scope of the present disclosure is not limited to such example types of connections. The selection may, for example, be made automatically (e.g., without user interaction during the selection process, etc.) and may depend on any one or more of a variety of factors, many examples of which are provided herein.

As shown in the example method 800, the cable connection is the preferred connection (e.g., selected whenever available), Bluetooth is the second priority selection (e.g., if available and suitable for the communication needs) and Wi-Fi is the third (or last) priority selection (e.g., if available and suitable for the communication needs). Thus, in the example method 800, the selection of connection type relies on the analysis of the possibility of using each of these three options, in the mentioned order, where the automatic transition from one choice to the next choice is only applied to the cases where the type of connection under analysis is not suited to the current context (e.g., the connection option is not available, there is a need for higher data throughput than provided by the connection option, etc.), as explained herein.

The example method 800 begins executing at block 805. The method 800 may begin executing for any of a variety of reasons, non-limiting examples of which are provided herein. For example, the example method 800 may begin executing in response to a power-up or reset condition. Also for example, the example method 800 may begin executing in response to a request for data acquisition received from a client, from a Cloud server that manages data acquisition, etc. Additionally for example, the example method 800 may begin executing periodically, in response to a user (e.g., controller, driver, etc.) command, in response to a detected event, etc. Further for example, the example method 800 may begin executing by receiving execution flow from another method (e.g., another method or portion thereof discussed herein, etc.).

Execution of the example method 800 flows to flow control block 810 at which it is determined whether a cable connection is available (e.g., between the Mobile AP and the OBD port). In general, the cable connection between the OBD port (e.g., OBD-II port, etc.) and the Mobile AP is the preferred connection, for example generally providing the most reliable connection, providing higher data throughputs than other connection options, providing greater security than other connections (e.g., being more difficult to hack than the wireless connection alternatives), freeing up wireless spectrum for other types of communication, etc. The cable connection may also, for example, allow for a wider range of Mobile AP placements inside a vehicle, for example in situations where it is required to locate the Mobile AP in a specific hidden place (e.g., locked in a compartment) or where there are other types of obstacles and hence, the wireless connection is poor. For these reasons, among others, the cable connection is the preferred (or default) connection. Note that the scope of this disclosure is not, however, limited thereto. Any of the other types of connections discussed herein may be preferred in various implementations or operational contexts.

At block 810, if the cable connection is available and various requirements that may be associated therewith are met, then block 810 directs execution flow of the example method 800 to block 840. If, however, block 810 determines that the cable connection is not sufficient, then block 810 directs execution flow of the example method 800 to block 820.

Block 810 may determine that the cable connection is insufficient for any one or more of a variety of reasons. For example, block 810 may determine that the cable connection is completely unavailable (e.g., due to a cable failure or malfunction, due to lack of a connected cable in or to the Mobile AP (e.g., an implementation decision, improper installation, etc.). Also for example, block 810 may determine that the cable connection is generally available but is presently exhibiting poor communication characteristics (e.g., intermittent connection outages, an unacceptable amount of noise, unusually high utilization by other vehicle systems, etc.).

At block 820, the example method 800 may determine whether a Bluetooth connection (e.g., between the Mobile AP and the OBD port) is available and suitable for the communication needs. In the example method 820, a Bluetooth connection may generally be preferred to a Wi-Fi connection for various reasons (e.g., lower power consumption, reduced RF footprint, more difficult to eavesdrop at a distance, etc.).

At block 820, if the Bluetooth connection is available and various requirements that may be associated therewith are met, then block 820 directs execution flow of the example method 800 to block 840. If, however, block 820 determines that the Bluetooth connection is not sufficient, then block 820 directs execution flow of the example method 800 to block 830.

Block 820 may determine that the Bluetooth connection is insufficient for any one or more of a variety of reasons. For example, block 820 may determine that the Bluetooth connection is completely unavailable (e.g., due to a transceiver failure or malfunction, due to lack of a Bluetooth transceiver in the Mobile AP or OBD system (e.g., an implementation decision, improper installation, etc.). Also for example, block 820 may determine (e.g., through probing, testing, etc.) that the Bluetooth connection is generally available but is presently exhibiting poor communication characteristics (e.g., too much latency or too long response time, too little presently available bandwidth, intermittent connection outages, an unacceptable amount of noise, etc.). Additionally for example, block 820 may determine that even under the best conditions, a Bluetooth connection is not able to provide the communication bandwidth needed for a particular data acquisition activity. This may, for example, be the case when there is a considerable amount of information being provided by (or acquired from) the vehicle's OBD system, where a Bluetooth connection might add considerable delay to the transmission of real-time data (e.g., in emergency situations, detection of an accident, vehicle malfunction situation, etc.), etc.

At block 830, the example method 800 may determine whether a Wi-Fi connection (e.g., between the Mobile AP and the OBD port) is available and suitable for the communication needs.

At block 830, if the Wi-Fi connection is available and various requirements that may be associated therewith are met, then block 830 directs execution flow of the example method 800 to block 840. If, however, block 830 determines that the Wi-Fi connection is not sufficient, then block 830 directs execution flow of the example method 800 to block 890, for example for communication of an error message and for restarting the connection selection process.

Note that in an example scenario in which execution of the example method 800 flows back up to block 810 for restarting the communication link selection process, such restarting may be performed with the knowledge that was just acquired at blocks 810, 820, and 830. For example, a second time (and third time, etc.) through blocks 810-830 may be performed with lowered communication goals. For example, after multiple attempts in which Bluetooth was found to be the best communication option but did not meet the originally specified communication goals, Bluetooth may be selected, and the goals may either be adjusted, the types and/or amount of data being communicated may be adjusted, etc.

Block 830 may determine that the Wi-Fi connection is insufficient for any one or more of a variety of reasons. For example, block 830 may determine that the Wi-Fi connection is completely unavailable (e.g., due to a transceiver failure or malfunction, due to lack of a Wi-Fi transceiver in the Mobile AP or OBD system (e.g., an implementation decision, improper installation, etc.), or due to a lack of a Wi-Fi transceiver that is presently available for communicating with the OBD system. Also for example, block 830 may determine (e.g., through probing, testing, etc.) that the Wi-Fi connection is generally available but is presently exhibiting poor communication characteristics (e.g., too much latency, too little presently available bandwidth for example due to high Wi-Fi utilization by end user or other devices, intermittent connection outages, an unacceptable amount of noise, etc.). Additionally for example, block 830 may determine that even under the best conditions, a Wi-Fi connection is not able to provide the communication bandwidth needed for a particular data acquisition activity (e.g., in a scenario in which only a cable connection will suffice, etc.).

The example method 800 may, at block 840, comprise searching for a communication protocol with which communication between the Mobile AP (or other entity through the Mobile AP) and the OBD system may occur. As discussed herein, the Mobile AP may have access to the OBD system's higher level communication protocol and/or the OBD system may have access to the Mobile AP's higher level communication protocol (e.g., a communication protocol having layers on top of the PHY/MAC layers of a Bluetooth link, Wi-Fi link, wired link, etc.). As also discussed herein, an intermediate circuit may provide protocol translation between the Mobile AP and the OBD system.

At flow control block 850, if the necessary communication protocol is not found and/or the capability for the Mobile AP and the OBD system to communicate effectively is not established, then execution of the example method 800 may flow to block 890, for example for communication of an error message and for restarting the connection selection process. Note that in various scenarios in which it is determined that no suitable connection is going to be found, execution of the example method 800 may terminate.

At flow control block 850, if the necessary communication protocol is found and the capability for the Mobile AP and the OBD system has been established, then execution flow of the example method 800 proceeds to block 860, at which the Mobile AP communicates to the OBD system to request data and at which the monitoring or data acquisition begins. Many examples of the types of data and/or manners in which the data is acquired, communicated, stored, provided to clients, etc., are provided herein. Note that the Mobile AP may retrieve the OBD data from the OBD system in any of a variety of manners (e.g., actively, utilizing a request/receive technique; passively, utilizing a passive receive technique; both actively and passively, etc.). Also as discussed herein, the types of data and/or manner in which the data is acquired are flexibly adaptable. Such adaptation may, for example, be performed at block 860 or any other block (or portion thereof).

The example method 800 continued executing at block 895. Such continued executing may comprise any of a variety of characteristics. For example, block 895 may direct execution flow back up to any previous block (or portion thereof) of the method 800 or to any block (or portion thereof) of any method discussed herein. Also for example, block 895 may direct execution flow to an adaptive operation procedure. Note that a system implementing the example method 800 may continue to analyze connection types and needs to determine a best type of connection. For example, if a preferred type of communication link (e.g., a cable) was not available initially, the method 800 may comprise periodically checking to determine whether the preferred type of communication link has become available.

As discussed herein (e.g., in the discussion of FIG. 7, etc.), various hardware configurations may be utilized for (or involved in) the retrieval of diagnostic data from the vehicle. For example, the OBU 790 (or Mobile AP) may interface with (and utilize) an external integrated circuit 780, which acts as an interpreter of the communication protocol used to access (or communicate with) the OBD system 710, and connects to the Diagnostic Link Connector (DLC) of the OBD port 745 (e.g., an OBD-II port, etc.), using an appropriate communication interface. Similarly, the DLC of the OBD port 745 (e.g., OBD-II port, etc.) may interface with (and utilize) the external integrated circuit 780 and connect to the OBU 790 (or Mobile AP) by using an appropriate (or selected) communication interface.

In an example implementation, the OBU 790 may integrate (or incorporate) the external integrated circuit 780 (or a portion thereof). Also for example, the OBD system 710 (e.g., the DLC of the OBD port 745) may integrate (or incorporate) the integrated circuit 780 (or a portion thereof).

In an example implementation, the interpretation of the communication protocol used to access the OBD system may be implemented by a processor of the OBU 790 (or Mobile AP) executing software stored in a non-transitory medium (e.g., a non-volatile memory, etc.), for example without the need of an external interpreter integrated circuit 780. The OBU 790 may then connect to the DLC of the OBD port 745 using an appropriate communication interface. Similarly, such functionality may also be performed at the OBD system 710 (e.g., the DLC of the OBD port 745) by a processor thereof operating in accordance with software instructions stored in a non-transitory medium (e.g., a non-volatile memory, etc.).

With regard to data acquisition, the OBD system of the vehicle generally provides several diagnostic services, such as current powertrain diagnostic data, powertrain freeze frame data, emission-related diagnostic trouble codes, vehicle information, among others. The service regarding current diagnostic data provides real-time data of the vehicle, which allows its constant monitoring. Such data is organized by codes, for example named parameter IDs (PIDs), that may be used to request a specific type of information from the vehicle, such as speed, engine RPM, ambient air temperature, barometric pressure, emission-related data, etc.

Not all PIDs, however, are supported by all systems. For example, some PIDs may be specific to a manufacturer (or make) and/or some PIDs may be specific to a model. This diversity presents various challenges with regard to collecting the same type of data for different vehicles.

The frequency (e.g., how often, under what circumstances, etc.) at which data is collected and its type may be defined depending on several factors (or inputs) such as the type of vehicle (e.g., make, model, light-duty, heavy-duty) the purpose being served by the vehicle (e.g., transporting people, transporting cargo, emergency operations, waste collection, etc.), the surrounding environment (e.g., location, number of vehicles nearby), the vehicle's status, notifications from the Cloud, among others. Non-limiting examples of inputs along with their influence in the decisions are provided herein.

In accordance with various aspects of this disclosure, the frequency or regularity at which OBD data is acquired is configurable and adaptable. For example, the period of periodically acquired data may be adapted, the time duration over which data is acquired may be adapted, the triggering conditions that cause data to be acquired may be adapted, the digital resolution of the acquired data may be adapted, etc. Many examples of such adaptation are provided herein.

In an example implementation, the manner in which OBD data is acquired may be based, at least in part, on vehicle location. Vehicle location may be ascertained in any of a variety of manners (e.g., from a vehicle GPS system or the like, from location determining functionality incorporated into the Mobile AP, from information received from the Cloud, by network detection, etc.).

For example, if the vehicle is in the city center, where some data values experience more frequent variations and thus, require a constant (or higher rate) monitoring (e.g., pollution levels (or other environmental conditions outside of the vehicle, etc.) provided by emission-related data, speed values and variations especially in crowded areas, fuel consumption variations due to the frequent stops and starts, etc.), the rate (e.g., periodic rate, etc.) at which such data is acquired (e.g., requested from the OBD system, etc.) may be increased. Also for example, if a cargo transport vehicle is traveling between pick-up and drop-off points, the rate at which data is acquired may be reduced, while if the vehicle is at or near a pick-up or drop-off point, the rate at which data is acquired may be increased. Additionally for example, when a vehicle is near an area in which an emergency condition has been declared, a traffic issue has been declared, etc., the rate at which data is acquired may be adapted (e.g., increased). Additionally for example, if the vehicle is operating in an area notorious for various vehicle failures (e.g., rugged terrain, micro-climates, traffic jams causing overheating, etc.), the rate at which OBD data is acquired may be increased. Also for example, if the vehicle has been detected (e.g., locally by the Mobile AP, by a cloud server or controller, etc.) as having departed from an expected route, or some other positional abnormality has been detected, then the rate at which OBD data is acquired may be increased.

Also for example, the manner in which OBD data is acquired may be adapted based, at least in part, on vehicle speed (e.g., as provided by the vehicle OBD system, as provided by GPS or other positioning system, etc.). For example, an abrupt variation in vehicle speed (e.g., together with accelerometer information from the Mobile AP (or OBD) system or other source, etc.) may be an indication of a potential accident, which may trigger an increase in the rate at which data is acquired. Additionally for example, in a scenario in which a vehicle has reached a steady state at which the vehicle is traveling at a safe and steady speed, the rate at which data is acquired from the OBD system may be decreased. Further for example, in a scenario in which a vehicle is traveling at a higher rate of speed than expected (or allowed), the rate at which data is acquired from the OBD system may be increased. Note that speed conditions (or any of the conditions discussed herein) may be processed and/or detected at the vehicle level, at the cloud level, etc., and data acquisition control commands may flow accordingly. For example, the Mobile AP may originate data acquisition control commands, may pass through control commands originated in the Cloud, etc.

Also for example, the manner in which OBD data is acquired may be adapted based, at least in part, on engine RPM (e.g., as provided by the vehicle OBD system). For example RPM data may be an indication of vehicle speed, it may also serve as an indication of whether the engine (or electric motor) has been turned off, whether (e.g., in an electric vehicle) the vehicle is still operating but has stopped, etc. For example, when a vehicle is stopped, the rate at which data is acquired (or particular types of data) may be reduced. Also, when a vehicle is stopped for a particular amount of time, or when the engine has been turned off, data acquisition may be halted or substantially reduced (e.g., to save battery energy, etc.). Note that the RPM data (or any data discussed herein) may be combined with other information when making data acquisition decisions. For example, data acquisition may be stopped if the vehicle has stopped moving for a threshold amount of time, and the engine has been turned off. Also for example, accelerometer (or vibration sensor) information, heat sensor information, weight sensor information, etc., may be utilized to determine whether the vehicle is occupied (or occupied by a person in the driver's seat) and still be utilized.

Additionally for example, the manner in which OBD data (or other data) is acquired may be adapted based, at least in part, on a trouble code reported by the OBD system. For example, depending on the trouble code, types of information and/or the regularity with which such information is acquired may be adapted. For example, a trouble code regarding a vehicle's braking system may trigger an increase in the rate at which braking information, speed information, etc., is acquired.

Further for example, the manner in which OBD data is acquired may be adapted based, at least in part, on weather (or other environmental conditions outside of the vehicle, etc.). For example in a scenario in which temperature is detected to be abnormally hot, data acquisition (e.g., regarding engine temperature, passenger compartment temperature, water pump functionality, air conditioner functionality, radiator functionality, battery health, etc.) may be increased. Note that data acquisition of other types of information (e.g., speed information, gas and oil levels, etc.) may be left unchanged. For example, each type of data acquired may be associated with an independent respective data acquisition plan. As another example, in rainy or snowy conditions, data acquisition related to brake operation and wheel traction may be increased.

Also for example, the manner in which data (e.g., OBD data, etc.) is acquired may be adapted based, at least in part, on road conditions (or other environmental conditions outside of the vehicle, etc.). For example, in a context in which wheel slippage and anti-lock breaking functionality indicate poor road conditions, the rate at which data acquisition is performed for vehicle handling-related data may be increased.

Still further for example, the manner in which OBD data is acquired may be adapted based, at least in part, on communication bandwidth. For example, in a context in which communication links between the Mobile AP and the cloud are poor or overloaded, the rate at which OBD data is collected and/or the digital resolution at which the information is being represented may be reduced, for example to relieve the communication burden on the system. Alternatively, in a scenario in which various types of OBD data are delay-tolerant, the Mobile AP may decide to buffer such information for later transmission.

Additionally for example, the manner in which OBD data is acquired may be adapted based, at least in part, on user input (e.g., driver input, central controller input, etc.). For example, a human (or automated) controller or a driver (e.g., local or remote) may determine a present need for more or less OBD data. For example, a driver might hear or feel or otherwise sense that there may be an issue with the manner in which the vehicle is operating, and input a signal to the system that causes the system to increase the rate at which OBD data is being collected. For example, a human operator may detect or anticipate various conditions that an automated system is not configured (or able) to detect or anticipate.

Additionally for example, the manner in which OBD data is acquired may be adapted based, at least in part, on a client's data subscription. For example, a client may subscribe to the collection of particular types of data and the acquisition of such data in particular manners. For example, a client may submit a plan that details the OBD data to be collected and the manner (e.g., regularity, triggers or conditions, time windows, etc.) in which the data is to be collected. Such a plan may be subject to change, where changes may then be propagated through the network to the Mobile AP and/or OBD system. Additionally, a data acquisition subscription may have a data limit, which may cause particular types of data (or all types of data) to be omitted as the data limit is approached. For example, as a data acquisition limit is being approached (e.g., within a threshold amount or percentage), data acquisition may be limited to relatively high priority data, for example with reduced collection regularity and/or reduced digital resolution. For example, a rate at which a particular type of data is being acquired may be slowed as a data limit is approached.

Further for example, the manner in which OBD data is acquired may be adapted based, at least in part, on a geo-fence description (e.g., as specified by a client, etc.). For example, a data collection plan may identify sets of data and respective manners of data collection for respective geographically defined areas. For example, when a vehicle is operating within a port area, a first set of data may be collected in a first specified manner, when the vehicle leaves the port area with authorization, a second set of data may be collected in a second specified manner, and when the vehicle leaves the port area without authorization, a third set of data may be collected in a third specified manner. Such geo-fence based adaptation may, for example, be aggregated with the location-based adaptation discussed herein.

Further for example, the manner in which OBD data is acquired may be adapted based, at least in part, on a type of vehicle and/or a manner in which a vehicle is presently being utilized. For example, in general particular types of data (e.g., instantaneous fuel economy information, current fuel economy as current speed, etc.) may have enhanced relevance, and thus be collected more frequently, for heavy-duty vehicles versus light-duty vehicles. Additionally for example, particular types of information (e.g., HVAC system, etc.) may have enhanced relevance for public transportation versus cargo transportation.

Still further for example, the manner in which OBD data is acquired may be adapted based, at least in part, on a type of client (or customer). For example, an operator of a waste collection fleet may specify that different amounts of information be acquired (e.g., with a different periodicity, different triggers, different time windows, etc.) than an operator of a public transportation fleet. Also for example, an operator of a cargo transportation fleet may specify that different amounts of information be acquired (e.g., with a different periodicity, different triggers, different time windows, etc.) than an operator of a school bus fleet. Even within a particular type of fleet, different operators may specify different respective manners of data collection.

Still further for example, the manner in which OBD data is acquired may be adapted based, at least in part, on a type of environment in which a vehicle is operating. For example, different manners of acquiring data may be collected when the vehicle is operated in a port, as when the vehicle is operated in an urban center, as when the vehicle is operated on a rural highway, as when the vehicle is operated on a farm, as when the vehicle is operated in a factory, etc. For example, a same vehicle may switch between different environments and thus the types of data acquired may adapt accordingly.

The above-mentioned examples were provided for illustrative purposes only and not by way of limitation. The manner in which OBD data is collected may be adapted in accordance with one or more of any of a variety of factors.

As discussed herein, in accordance with various aspects of this disclosure, the type of data (e.g., OBD data) acquired or communicated may be flexibly adapted based on any of a variety of criteria, non-limiting examples of which are provided herein. Note that, as with the manner in which the data is collected, each type of data may be controlled independently.

In an example implementation, the data (e.g., OBD data, etc.) acquired may be based, at least in part, on vehicle location. For example, if the vehicle is in the city center (or in an area known for traffic congestion, industrial pollution, etc.), emission-related data may be requested from the OBD system. For example, different types of data may be requested from a vehicle operating in a port than a vehicle operating in an urban center. Also for example, if the vehicle is currently operating in a school zone or another zone in which maximum speed must be strictly controlled, speed information for the vehicle may be requested. Additionally for example, if the vehicle is currently operating on a road (or in a region) that has been determined to be slippery, tracking and braking information may be acquired. Additionally for example, if the vehicle is currently approaching an approved refueling station, data related to fuel level and/or consumption may be acquired. Further for example, if the vehicle has been detected as having departed from a planned route, data related to vehicle operation and/or control may be collected.

Also for example, the data (e.g., OBD data) acquired may be adapted based, at least in part, on vehicle speed (e.g., as provided by the vehicle OBD system, as provided by GPS or other positioning system, etc.). For example, an abrupt variation in vehicle speed (e.g., together with accelerometer information from the Mobile AP or OBD system or other source, etc.) may be an indication of a potential accident, which may trigger retrieval of trouble codes, speed, braking, temperature, etc. Additionally for example, in a scenario in which a vehicle has reached a steady state at which the vehicle is traveling at a safe and steady speed, the acquisition of particular types of data (e.g., emission control data, brake performance data, etc.) may be halted. Further for example, in a scenario in which a vehicle is traveling at a higher rate of speed than expected (or allowed), various types of information related to engine cooling, shock and vibration, etc., may be acquired. Note that speed conditions (or any of the conditions discussed herein) may be processed and/or detected at the vehicle level, at the cloud level, etc., and data acquisition control commands may flow accordingly. For example, the Mobile AP may originate data acquisition control commands, may pass through control commands originated in the Cloud, etc.

Also for example, the data (e.g., OBD data) acquired may be adapted based, at least in part, on engine RPM (e.g., as provided by the vehicle OBD system). For example RPM data may be an indication of vehicle speed, it may also serve as an indication of whether the engine has been turned off, whether (e.g., in an electric vehicle) the vehicle is still operating but has stopped, etc. For example, when a vehicle is stopped, there might no longer be a need for various types of information. Also, when a vehicle is stopped for a particular amount of time, or when the engine has been turned off, data acquisition for any of a variety of data types (e.g., speed sensing, traction sensing, etc.) may be halted or substantially reduced (e.g., to save battery energy, etc.), while other data types may be at least occasionally acquired (e.g., battery state information, vehicle security system information, etc.). Note that the RPM data (or any data discussed herein) may be combined with other information when making data acquisition decisions. For example, acquisition of data related to vehicle speed may be stopped if the vehicle has stopped moving for a threshold amount of time and the engine has been turned off. Also for example, accelerometer (or vibration sensor) information, heat sensor information, weight sensor information, etc., may be utilized to determine whether the vehicle is occupied (or occupied by a person in the driver's seat) and still being utilized.

Additionally for example, the data (e.g., OBD data) acquired may be adapted based, at least in part, on a trouble code reported by the OBD system. For example, depending on the trouble code, types of information and/or the regularity with which such information is acquired may be adapted. For example, a trouble code regarding a vehicle's braking system may trigger acquisition of speed information, collision detection information, temperature information, etc.

Further for example, the data (e.g., OBD data, etc.) acquired may be adapted based, at least in part, on weather. For example in a scenario in which temperature is detected to be abnormally hot, various types of data (e.g., regarding engine temperature, passenger compartment temperature, water pump functionality, air conditioner functionality, radiator functionality, battery health, etc.) may be acquired.

Note that data acquisition of other types of information (e.g., speed information, gas and oil levels, etc.) may be left unchanged. In other words, each type of data may be associated with an independent respective data acquisition plan. As another example, in rainy or snowy conditions, data related to brake operation and wheel traction may be acquired.

Also for example, the data (e.g., OBD data, etc.) acquired may be adapted based, at least in part, on road conditions. For example, in a context in which wheel slippage and anti-lock breaking functionality indicate poor road conditions, data related to vehicle handling may be acquired.

Still further for example, the data (e.g., OBD data, etc.) acquired may be adapted based, at least in part, communication bandwidth. For example, in a context in which communication links between the Mobile AP and the cloud are poor or overloaded, the acquisition of particular types of data (e.g., relatively low priority data) or all data may be halted, for example to relieve the communication burden on the system. Alternatively, in a scenario in which various types of OBD data are delay-tolerant, the Mobile AP may decide to buffer such information for later transmission. In an example scenario, relatively high-priority information may be acquired and communicated to the Cloud, while relatively mid-priority information may be acquired and stored locally until communication conditions are favorable, while relatively low-priority information might not be acquired at all.

Additionally for example, the data (e.g., OBD data, etc.) acquired may be adapted based, at least in part, on user input (e.g., driver input, central controller input, etc.). For example, a human (or automated) controller or a driver (e.g., local or remote) may determine a present need for any one or more types of OBD data. For example, a driver might hear or feel or otherwise sense that there may be an issue with the manner in which the vehicle is operating, and input a signal to the system that causes the system to collect (or collect more of) a particular type of data (e.g., engine temperature data, breaking system data, cooling system data, heater or air-conditioner data, etc.). For example, a human operator may detect or anticipate various conditions that an automated system is not configured (or able) to detect or anticipate.

Additionally for example, the data (e.g., OBD data, etc.) acquired may be adapted based, at least in part, on a client's data subscription. For example, a client may subscribe to the collection of particular types of data and the acquisition of such data in particular manners. For example, a client may submit a plan that details the OBD data to be collected and the manner (e.g., regularity, triggers or conditions, time windows, etc.) in which the data is to be collected. Such a plan may be subject to change, where changes may then be propagated through the network to the Mobile AP and/or OBD system. Additionally, a data acquisition subscription may have a data limit, which may cause particular types of data (or all types of data) to be omitted as the data limit is approached. For example, as a data acquisition limit is being approached (e.g., within a threshold amount or percentage), data acquisition may be limited to relatively high priority data, for example with reduced collection regularity and/or reduced digital resolution.

Further for example, the data (e.g., OBD data, etc.) acquired may be adapted based, at least in part, on a geo-fence description (e.g., as specified by a client, etc.). For example, a data collection plan may identify sets of data and respective manners of data collection for respective geographically defined areas. For example, when a vehicle is operating within a port area, a first set of data may be collected in a first specified manner, when the vehicle leaves the port area with authorization, a second set of data may be collected in a second specified manner, and when the vehicle leaves the port area without authorization, a third set of data may be collected in a third specified manner. Such geo-fence based adaptation may, for example, be aggregated with the location-based adaptation discussed herein.

Further for example, the data (e.g., OBD data, etc.) acquired may be adapted based, at least in part, on a type of vehicle and/or a manner in which a vehicle is presently being utilized. For example, in general particular types of data (e.g., instantaneous fuel economy information, current fuel economy at current speed, etc.) may have enhanced relevance, and thus be collected, for heavy-duty vehicles versus light-duty vehicles. Additionally for example, particular types of information (e.g., HVAC system, etc.) may have enhanced relevance for public transportation versus cargo transportation.

Still further for example, the data (e.g., OBD data, etc.) acquired may be adapted based, at least in part, on a type of client (or customer). For example, an operator of a waste collection fleet may specify that different types of information be acquired than an operator of a public transportation fleet. Also for example, an operator of a cargo transportation fleet may specify that different types of information be acquired than an operator of a school bus fleet. Even within a particular type of fleet, different operators may specify that different types of data be collected.

Still further for example, the data (e.g., OBD data, etc.) acquired may be adapted based, at least in part, on a type of environment in which a vehicle is operating. For example, different types of data may be collected when the vehicle is operated in a port, as when the vehicle is operated in an urban center, as when the vehicle is operated on a rural highway, as when the vehicle is operated on a farm, as when the vehicle is operated in a factory, etc. For example, a same vehicle may switch between different environments and thus the types of data acquired may adapt accordingly.

The above-mentioned examples were provided for illustrative purposes only and not by way of limitation. The types of data (e.g., OBD data) collected may be adapted in accordance with one or more of any of a variety of factors. Accordingly, the scope of this disclosure should not be limited by characteristics of particular types of data, particular manners of acquiring such data, and/or factors utilized in determining the types of data collected or the manners of collecting such data.

In accordance with various aspects of the present disclosure, any of a variety of OBD-related notifications may be communicated to the Cloud, non-limiting examples of which are provided herein. Such notifications may be sent in response to a request for such notifications and/or such notifications may be sent to the Cloud in an asynchronous or unsolicited manner. Note that the notification may be originated at various nodes of the network (e.g., at the OBD system, at the Mobile AP in response to data received from the OBD system, etc.).

For example, such notifications may comprise a notification of distance traveled by the vehicle (e.g., provided by the vehicle's OBD system, etc.). In an example scenario, such a notification may be generated when a distance threshold is reached (e.g., as a "routing maintenance" warning, as a warning of an unanticipated amount of travel, etc.).

Also for example, such notifications may comprise a trouble code (e.g., provided by the vehicle's OBD system, etc.). In an example scenario, such a notification may be generated when a trouble code is set by the OBD system (e.g., related to a braking system issue, an excessive temperature issue, a low oil indicator, etc.). Such a notification may, for example, be generated to indicate that a check-up is needed.

Additionally for example, such notifications may comprise a warning to indicate that the fuel level (or oil level, transmission fluid level, brake fluid level, etc.) is low. Further for example, such notifications may comprise a warning that the driver has exceeded a speed limit allowed on a road, exceeded a speed limit set by a fleet owner or manager, etc.

Further for example, in response to a communication failure (or a number of consecutive failures, for example after several restart attempts) between the Mobile AP and the OBD system of the vehicle, a notification may be sent to the Cloud.

In accordance with various aspects of the disclosure, the OBD data acquisition may be enabled or disabled by a client request to the Cloud (e.g., by accessing a network monitoring center) or as a decision of the data acquisition control algorithm (e.g., in situations in which there is a need to save power at the vehicle, in areas not covered by the client's geo-fence subscription, etc.).

As discussed herein, the Mobile AP (or OBU) may communicate data (e.g., from the OBD system, etc.) to the Cloud. Such communication may be performed in any of a variety of manners, non-limiting examples of which are provided herein.

For example, the Mobile AP may communicate data retrieved from the vehicles to the Cloud by using one or more of a variety of communication backhauls (e.g., DSRC, LTE, Wi-Fi, etc.). A backhaul (or network) selection algorithm may select a backhaul based on one or more of any of a variety of criteria (e.g., based on received inputs, based on the vehicle's context, based on the type of information to transmit, etc.).

An example selection strategy may, for example, be generally analogous to that discussed herein with regard to FIG. 8 (e.g., utilizing any or all of the same selection criteria discussed with regard to FIG. 8, utilizing a prioritized selection strategy, etc.). In this example implementation, a DSRC backhaul may be set as the preferred (or default) backhaul, for example being generally less expensive and having a generally greater data rate than the cellular/LTE option. In an example scenario in which the geographical area in which the vehicle is operating is not covered by the DSRC network (e.g., by Fixed APs, a multi-hop Mobile AP network, etc.), the algorithm may search for available Wi-Fi APs. If Wi-Fi APs are available, then the data may be communicated through the Wi-Fi interface. Otherwise the cellular network interface may be utilized. In an example scenario involving an emergency communication (e.g., regarding vehicle damage or malfunction indicated by the OBD data, dangerously low fuel level indicated by the OBD data, etc.), the backhaul selection algorithm may transition directly from the default DSRC option to the cellular option, for example in which the data is immediately communicated through a reliable cellular network (e.g., utilizing LTE, etc.). As discussed herein, data may also be communicated in an opportunistic or a delay-tolerant manner, for example in which the data may be temporarily stored until a desired communication pathway is available, in which the data is temporarily stored until higher-priority data has been communicated, etc. Note that a request for OBD data (e.g., from a Cloud server, etc.) may designate the type of communication link to utilize for returning the OBD data to the requestor.

Note that data may (e.g., instead of being communicated to the Cloud or in addition to being communicated to the Cloud) be displayed on a screen (or any user interface mechanism), for example as a notification to the driver. This functionality may, for example, be requested by the user or may be automatically performed (e.g., without direct human interaction) by the algorithm based on any one or more of a variety of considerations. For example, a visual output may be provided to the driver if a speed limit (e.g., a legal limit, fleet policy, etc.) is exceeded, if a trouble code (e.g., regarding brakes, steering, suspension, etc.) is detected, if a level of fuel consumption is too high, if a level of remaining fuel is too low, if an engine has been running (or the vehicle has been moving) for too long (e.g., a message telling the driver to take a break may be generated), if a message from a dispatcher or controller is received, etc.).

Though the OBD (e.g., OBD-II, etc.) system has been generally utilized herein as an example, the scope of this disclosure is not limited thereto. For example, the scope of this disclosure readily applies to other vehicle monitoring and/or diagnostic systems (e.g., standardized, proprietary, etc.). For example, the OBD-II standard is currently mandatory on various vehicles, for example light-duty vehicles (e.g., passenger cars, light-duty trucks, etc.), medium-duty vehicles, heavy-duty (HDOBD) vehicles, etc. Various changes, however, may be implemented for medium and heavy-duty vehicles.

For example, since such vehicles typically utilize a 24V supply voltage, the DLC utilized to access the OBD system may be different from the system utilized in light-duty vehicles. Also for example, the communication protocol may be different from the protocol used by light-duty vehicles, but in some cases may be the same (e.g., ISO 15765-4 CAN). In an example scenario in which the protocol is different (e.g., the SAE J1939—non OBD-II standard), the communication protocol is readily adaptable, for example since the format for data transfer is similar. Additionally for example, the OBD systems of such vehicles may utilize more types of diagnostic messages (e.g., additionally PIDs may exist). Accordingly, a system and method implemented in accordance with various aspects of this disclosure may be readily configured for utilization with light-duty, medium-duty, and heavy-duty vehicles.

As mentioned herein, the communication protocol utilized by modern light-duty vehicles (e.g., since 2008) may generally be the same (e.g., ISO 15765-4 CAN). For maritime vehicles (e.g., ships, boats, etc.) various other protocols may be utilized. For example, in an example implementation in which the NMEA 2000 standard (e.g., non OBD-II standard) is utilized, an interface and data format almost identical to that used in one of the communication protocols used by the heavy-duty vehicles is utilized, and thus few configuration adaptations are necessary. Also for example, specific messages (e.g., diagnostic messages, etc.) may be defined for the marine environment (e.g., as defined by Parameter Group Numbers (PGNs)).

Similarly, the methods and systems discussed herein are readily adaptable to other types of vehicles, for example rail vehicles, aircraft, manually driven or automated vehicles, drones, etc.

Methods and systems implemented in accordance with various aspects of this disclosure are readily adaptable to these different types of vehicles. Such adaptation or configuration may, for example, be implemented at design or installation time, but may also be performed in real-time during system utilization. For example, the system is adaptable to these different types of vehicles as it automatically detects and changes the communication protocol according to each case.

As discussed herein, the data (e.g., OBD data, etc.) may be stored, processed, and/or made available in the Cloud. For example, several metrics regarding the vehicle's status, the city's status, the port's status, etc., may be made available to the clients (or customers). For example, the Cloud (e.g., servers, databases, etc.) may provide the customers real-time access to vehicle information (e.g., current speed, engine RPM, engine load, temperature, any or all of the monitored characteristics discussed herein, etc.) and also access to historical or processed data (e.g., average fuel consumption/outside temperature/throttle position last day/week/month over each vehicle's entire route) of their vehicle(s) and the city.

Additionally customer-configurable reports may be generated, for example for each vehicle, vehicle fleet, city or neighborhood, port, all fleets, etc., where such reports may provide any or all of the diagnostic data discussed herein, and other types of data. Such reports may be tailored to individual drivers, dispatchers, fleet controllers, managers, maintenance shops, researchers, etc. Such reports may, for example, be generated upon request, generated automatically in accordance with a regular schedule (e.g., at a particular frequency, at defined times, etc.).

In accordance with various aspects of this disclosure, smart systems and methods provide the ability to continuously monitor a vehicle, fleet of vehicles, multiple fleets of vehicles, etc., and act according to their state, their surrounding environment or context, etc.

In accordance with various aspects of the disclosure, the data (e.g., OBD data, etc.) and/or metrics obtained from processing such data may be sold to different types of clients (e.g., private and public fleets, regular consumers, environmental organizations, municipal planners, among others) so they can manage and control their vehicles. For example, a fleet manager may want to have information about their drivers' behaviors, engine status and the average fuel consumption of their vehicles, any of the data or metrics discussed herein, etc. Access to such information may, for example, provide for increased security and quality of their fleet or vehicle (e.g., by detecting issues before they have a chance to adversely affect fleet performance, proactively performing preventive maintenance, etc.), and may provide for timely intervention in environmental issues.

Figure 9:
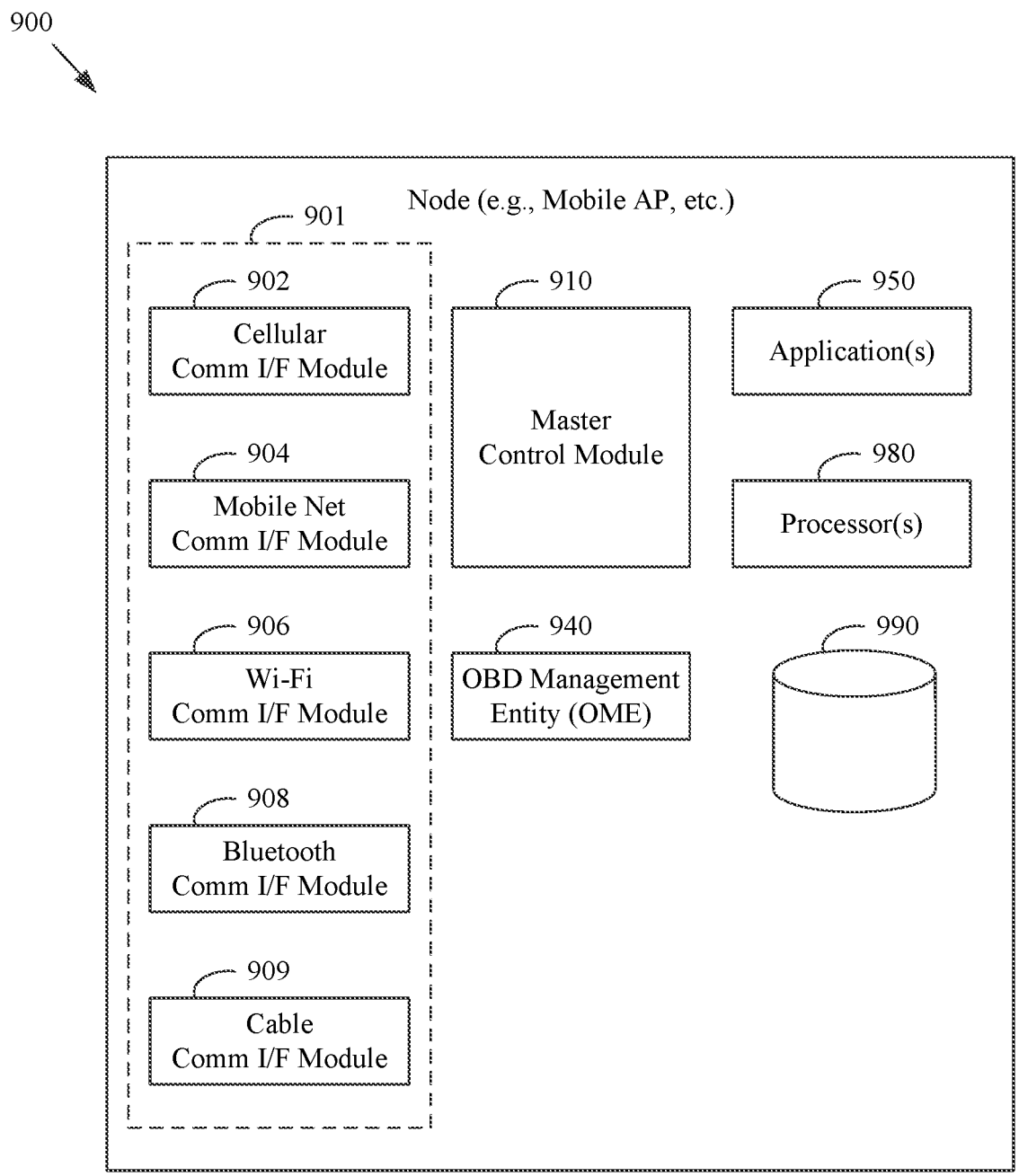
FIG. 9 shows a flow diagram of a network node for managing OBD data, in accordance with various aspects of the present disclosure.

FIG. 9 shows a block diagram of various components of an example network node, in accordance with various aspects of the present disclosure. The example node 900 may, for example, share any or all characteristics with the other example methods, networks, and/or network components 100, 200, 300, 400, 500-570, 600, 700, and 800 discussed herein. For example, any or all of the components of the example node 900 may perform any or all of the method steps presented herein.

The network node 900 may, for example, comprise a Mobile AP (or OBU). Also for example, the network node 900 may comprise a general access point (AP) node (e.g., a Mobile AP, a Fixed AP, etc.), infrastructure node, Cloud server or database, client control node, any node presented herein, etc. The example node 900 may comprise a variety of components (or modules), non-limiting examples of which are provided herein.

The example node 900 may, for example, comprise a communication interface (I/F) module 901 (e.g., including a cellular (e.g., LTE, etc.) communication interface module 902, a mobile network (e.g., DSRC, 802.11p, etc.) communication interface module 904, a Wi-Fi (e.g., 802.11 a/b/g/n/ac, other LAN, etc.) communication interface module 906, a Bluetooth (or other PAN) interface module 908, a cable (or wireline) communication interface module 909, etc.). Such modules may, for example, be operable to perform any or all of the communication functionality discussed herein for the node 900.

For example, the communication interface module 901 may operate to perform any or all of the wireless and/or wired communication functionality for the node 900, many examples of which are provided herein (e.g., communication with sensors external to the node 900, communication with the onboard diagnostic (OBD) system of a vehicle in which the node 900 is installed, communication with peer nodes (e.g., APs), communication between Mobile APs and Fixed APs, communication with Network Controllers, communication with client devices, backhaul communication, Cloud server and/or database communication, etc.). The communication interface (I/F) module 901 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, etc.

The example node 900 may, for example, comprise an OBD Management Entity (OME) 940 that operates to manage the acquisition, analysis, and/or communication of OBD data (or metrics associated therewith), etc. The example OME 940 may, for example, comprise hardware and/or software that operate to implement any or all of the node's data (e.g., OBD data, etc.) interface functionality, data (e.g., OBD data, etc.) collection, data (e.g., OBD data, etc.) analysis, data (e.g., OBD data, etc.) and/or metric communication, and/or data-related (e.g., OBD data-related, etc.) functionality discussed herein. For example, the OME 940 may operate to perform any or all blocks of the example method 800 and/or any other method or function discussed herein.

The example node 900 may, for example, comprise a Master Control Module 910 that generally manages operation of the node 900 at a high level. Such Master Control Module 910 may, for example, comprise various aspects of an operating system for the node 900.

The example node 900 may further, for example, comprise one or more applications 950 executing on the node 900 (e.g., client management applications, security applications, power management applications, OBD-related applications, vehicle monitoring applications, location services applications, sensor interface applications, etc.).

The example node 900 may also comprise one or more processors 980 and memory devices 990. The processor(s) 980 may, for example, comprise any of a variety of processor characteristics. For example, the processor(s) 980 may comprise one or more of a general purpose processor, RIS processor, microcontroller, ASIC, DSP, video processor, etc. The memory device(s) 990 may, for example comprise any of a variety of memory characteristics. For example, the memory device(s) 990 may comprise a volatile memory, non-volatile memory, etc. The memory device(s) 990 may, for example, comprise a non-transitory computer-readable medium that comprises software instructions that when executed by the processor(s) 980, cause the node 900 to perform any or all of the functionality discussed herein (e.g., with regard to the example methods discussed herein, etc.). The memory device(s) 990 may, for example, store data (e.g., acquired OBD data and/or metrics associated therewith, etc.), for example as controlled by the OME 940.

In summary, various aspects of this disclosure provide systems and methods for managing vehicle on-board diagnostic (OBD) data in a network of moving things. As non-limiting examples, various aspects of this disclosure provide systems and methods for interfacing with vehicle OBD systems, acquiring OBD data, communicating OBD data, and/or processing OBD data in a network of moving things. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A mobile access point (MAP) comprising:
an electrical circuit comprising at least one module operable to, at least:
provide general Wireless Local Area Network (WLAN) service within and around a vehicle to which the MAP is mounted and while the vehicle is moving;
select a type of communication link for use in communication, within the vehicle, between the MAP and an On-Board Diagnostic (OBD) system of the vehicle, wherein the type of communication link comprises one of a wired connection, a WLAN based wireless connection, and a non-WLAN based wireless connection, and wherein selecting the type of communication link comprises:
attempting to select, from a list of types of communication links, a type of communication link that is available and meets a set of communication requirements for a set of OBD data; and
if none of the list of types of communication links meets the set of communication requirements for the set of OBD data, then:
adjusting the set of OBD data; and
re-attempting to select, from the list of types of communication links, a type of communication link that meets the set of communication requirements for the adjusted set of OBD data;
establish, based on the selected type, a communication link between the MAP and the OBD system; and
communicate WLAN information associated with the WLAN service and OBD information associated with the OBD system with at least one communication infrastructure node.

2. The mobile access point (MAP) of claim 1, wherein the at least one module is simultaneously operable as a WLAN access point for at least personal electronic devices and as a router to provide an interface to the OBD system.

3. The mobile access point (MAP) of claim 1, wherein the at least one module is operable to select the type of communication link from a prioritized hierarchy of types of communication links between the MAP and the OBD system.

4. The mobile access point (MAP) of claim 1, wherein the at least one module is operable to select the type of communication link by, at least in part, operating to:
attempt to select, from a list of types of communication links, a type of communication link that is available and meets a set of communication requirements; and
if none of the list of types of communication links meets the set of communication requirements, then:
adjust the set of communication requirements; and
re-attempt to select, from the list of types of communication links, a type of communication link that meets the adjusted set of communication requirements.

5. The mobile access point (MAP) of claim 1, wherein the at least one module is operable to identify a proprietary OBD protocol for communication between the MAP and the OBD system.

6. The mobile access point (MAP) of claim 5, wherein the at least one module is operable to translate between the identified priority OBD protocol and a protocol used by a destination node of the communicated OBD information.

7. A mobile access point (MAP) comprising:
an electrical circuit comprising at least one module operable to, at least:
provide general Wireless Local Area Network (WLAN) service within and around a vehicle carrying the MAP;
select a type of communication link for use in communication, within the vehicle, between the MAP and an On-Board Diagnostic (OBD) system of the vehicle, wherein the type of communication link comprises one of a wired connection, a WLAN based wireless connection, and a non-WLAN based wireless connection, and wherein selecting the type of communication link comprises:
attempting to select, from a list of types of communication links, a type of communication link that is available and meets a set of communication requirements for a set of OBD data; and
if none of the list of types of communication links meets the set of communication requirements for the set of OBD data, then:
adjusting the set of OBD data; and
re-attempting to select, from the list of types of communication links, a type of communication link that meets the set of communication requirements for the adjusted set of OBD data;
establish, based on the selected type, a communication link between the MAP and the OBD system;
retrieve OBD information from the OBD system over the communication link in a first manner;
receive input information describing a current operating environment in which the MAP and/or the vehicle is operating;
adapt the first manner to a second manner based, at least in part, on the received input information; and
retrieve OBD information from the OBD system over the communication link in the second manner.

8. The mobile access point (MAP) of claim 7, wherein:
the first manner comprises retrieving a particular type of the OBD information from the OBD system at a first rate; and
the second manner comprises retrieving the particular type of the OBD information from the OBD system at a second rate different from the first rate.

9. The mobile access point (MAP) of claim 7, wherein:
the first manner comprises retrieving the OBD information from the OBD system in response to a first set of trigger conditions; and the second manner comprises retrieving the OBD information from the OBD system in response to a second set of trigger conditions different from the first set of trigger conditions.

10. The mobile access point (MAP) of claim 7, wherein:
the first manner comprises retrieving a first set of one or more types of the OBD information from the OBD system; and
the second manner comprises retrieving a second set of one or more types of the OBD information from the OBD system, wherein the second set is different from the first set.

11. The mobile access point (MAP) of claim 7, wherein:
the first manner comprises retrieving the OBD information from the OBD system at a first resolution; and
the second manner comprises retrieving the OBD information from the OBD system at a second resolution different from the first resolution.

12. The mobile access point (MAP) of claim 7, wherein the received input information comprises location information indicating a location of the MAP and/or the vehicle.

13. The mobile access point (MAP) of claim 7, wherein the received input information comprises speed information indicating a speed of the MAP and/or the vehicle.

14. The mobile access point (MAP) of claim 7, wherein the received input information comprises information about an environmental condition external to the vehicle carrying the MAP.

15. The mobile access point (MAP) of claim 7, wherein the received input information comprises information about current communication conditions.

16. The mobile access point (MAP) of claim 7, wherein the received input information comprises information received from a Cloud server.

17. A mobile access point (MAP) comprising:
an electrical circuit comprising at least one module operable to, at least:
provide general Wireless Local Area Network (WLAN) service within and around a vehicle carrying the MAP;
select a type of communication link for use in communication, within the vehicle, between the MAP and an On-Board Diagnostic (OBD) system of the vehicle, wherein the type of communication link comprises one of a wired connection, a WLAN based wireless connection, and a non-WLAN based wireless connection, and wherein selecting the type of communication link comprises:
attempting to select, from a list of types of communication links, a type of communication link that is available and meets a set of communication requirements for a set of OBD data; and
if none of the list of types of communication links meets the set of communication requirements for the set of OBD data, then:
adjusting the set of OBD data; and
re-attempting to select, from the list of types of communication links, a type of communication link that meets the set of communication requirements for the adjusted set of OBD data;
establish, based on the selected type, a communication link between the MAP and the OBD system;
retrieve first OBD information from the OBD system over the communication link;
determine to communicate the retrieved first OBD information to a destination node immediately;
communicate the retrieved first OBD information to the destination node immediately;
retrieve second OBD information from the OBD system;
determine to communicate the retrieved second OBD information to the destination node in a delay-tolerant manner; and
communicate the retrieved second OBD information to the destination node in a delay-tolerant manner.

18. The mobile access point (MAP) of claim 17, wherein the at least one module is operable to:
determine to communicate the retrieved first OBD information to the destination node immediately over a first type of communication network; and
determine to communicate the retrieved second OBD information to the destination node in a delay-tolerant manner over a second type of communication network different from the first type of communication network.

19. The mobile access point (MAP) of claim 17, wherein the at least one module is operable to determine to communicate the retrieved second OBD information to the destination node in a delay-tolerant manner by, at least in part, operating to determine to wait until a particular type of communication network becomes available before communicating the retrieved second OBD information to the destination node.

20. The mobile access point (MAP) of claim 17, wherein the at least one module is operable to:
determine to communicate the retrieved first OBD information to the destination node immediately via a cellular communication network; and
determine to communicate the retrieved second OBD information to the destination node in a delay-tolerant manner through a vehicle communication network.

21. The mobile access point (MAP) of claim 17, wherein the at least one module is operable to:
determine to communicate the retrieved first OBD information to the destination node immediately based, at least in part, on a value of the first OBD information; and
determine to communicate the retrieved second OBD information to the destination node in a delay-tolerant manner based, at least in part, on a value of the second OBD information.

22. The mobile access point (MAP) of claim 17, wherein the at least one module is operable to receive input information and switch from communicating OBD information retrieved from the OBD system of the vehicle immediately to communicating OBD information retrieved from the OBD system of the vehicle in a delay-tolerant manner based, at least in part, on the received input information.

23. The mobile access point (MAP) of claim 22, wherein the received input information comprises location information indicating a location of the MAP and/or the vehicle.

24. The mobile access point (MAP) of claim 22, wherein the received input information comprises speed information indicating a speed of the MAP and/or the vehicle.

25. The mobile access point (MAP) of claim 22, wherein the received input information comprises information about an environmental condition external to the vehicle carrying the MAP.

26. The mobile access point (MAP) of claim 22, wherein the received input information comprises information about current communication conditions.

27. The mobile access point (MAP) of claim 22, wherein the received input information comprises information received from a Cloud server.

28. The mobile access point (MAP) of claim 22, wherein the vehicle is an autonomous vehicle.

\* \* \* \* \*